United States Patent
Panandiker et al.

(10) Patent No.: US 10,752,864 B2
(45) Date of Patent: *Aug. 25, 2020

(54) POLYETHYLENE GLYCOL-BASED LAUNDRY DETERGENT COMPRISING FUNCTIONALIZED SILOXANE POLYMERS

(71) Applicant: The Procter & Gamble Company, Cincinnati, OH (US)

(72) Inventors: Rajan Keshav Panandiker, West Chester, OH (US); Bernard William Kluesener, Harrison, OH (US)

(73) Assignee: The Procter & Gamble Company, Cincinnati, OH (US)

(*) Notice: Subject to any disclaimer, the term of this patent is extended or adjusted under 35 U.S.C. 154(b) by 155 days.

This patent is subject to a terminal disclaimer.

(21) Appl. No.: 16/039,355

(22) Filed: Jul. 19, 2018

(65) Prior Publication Data

US 2019/0024018 A1    Jan. 24, 2019

Related U.S. Application Data

(60) Provisional application No. 62/535,359, filed on Jul. 21, 2017, provisional application No. 62/534,313, filed on Jul. 19, 2017.

(51) Int. Cl.

| | | |
|---|---|---|
| *C11D 3/37* | (2006.01) | |
| *C08G 77/48* | (2006.01) | |
| *C08L 83/14* | (2006.01) | |
| *C08G 77/54* | (2006.01) | |
| *C11D 1/14* | (2006.01) | |
| *C11D 1/22* | (2006.01) | |
| *C11D 3/30* | (2006.01) | |
| *C11D 11/00* | (2006.01) | |
| *C11D 1/65* | (2006.01) | |
| *C08L 75/04* | (2006.01) | |

(52) U.S. Cl.
CPC ............ *C11D 3/3738* (2013.01); *C08G 77/48* (2013.01); *C08G 77/54* (2013.01); *C08L 83/14* (2013.01); *C11D 1/146* (2013.01); *C11D 1/22* (2013.01); *C11D 3/30* (2013.01); *C11D 3/373* (2013.01); *C11D 3/3742* (2013.01); *C11D 11/0017* (2013.01); *C08L 75/04* (2013.01)

(58) Field of Classification Search
CPC ......... C11D 1/62; C11D 3/001; C11D 3/3742; C11D 3/505; C11D 9/36; C11D 11/0017; C11D 3/162
See application file for complete search history.

(56) References Cited

U.S. PATENT DOCUMENTS

| | | |
|---|---|---|
| 7,319,120 B2 | 1/2008 | Herzig et al. |
| 7,867,968 B1 | 1/2011 | Aouad |
| 7,871,976 B1 | 1/2011 | Aouad |
| 8,404,882 B2 | 3/2013 | Hagiwara |
| 8,476,219 B2 | 7/2013 | Aouad |
| 8,865,029 B2 | 10/2014 | Evans et al. |
| 10,301,575 B2 | 5/2019 | Lynch |
| 2010/0267601 A1 | 10/2010 | Panandiker et al. |
| 2011/0190455 A1 | 8/2011 | Partington |
| 2012/0270765 A1 | 10/2012 | Aouad |
| 2013/0123166 A1* | 5/2013 | Gizaw .............. C11D 3/3723 510/527 |
| 2015/0307816 A1* | 10/2015 | Panandiker ...... C11D 3/3742 510/276 |
| 2016/0137674 A1 | 5/2016 | Panandiker et al. |
| 2016/0304808 A1 | 10/2016 | Lynch |
| 2016/0304809 A1 | 10/2016 | Lynch |
| 2016/0304810 A1 | 10/2016 | Lynch |
| 2016/0304811 A1 | 10/2016 | Lynch |
| 2016/0304812 A1 | 10/2016 | Lynch |
| 2016/0304819 A1 | 10/2016 | Lynch |
| 2019/0010293 A1 | 1/2019 | Frankenbach |
| 2019/0010427 A1 | 1/2019 | Frankenbach |
| 2019/0024019 A1 | 1/2019 | Panandiker |

FOREIGN PATENT DOCUMENTS

| | | |
|---|---|---|
| CN | 104817700 A | 5/2015 |
| EP | 3106902 A1 | 12/2016 |
| JP | 2011168495 A | 9/2011 |
| WO | WO2008132236 A2 | 11/2008 |
| WO | WO2009121148 A1 | 10/2009 |

OTHER PUBLICATIONS

U.S. Appl. No. 16/039,353, filed Jul. 19, 2018, Panandiker, et al.
International Search Report; International Application No. PCT/US2018/042864; dated Dec. 3, 2018; 20 pages.
International Search Report; International Application No. PCT/US2018/042866; dated Dec. 3, 2018; 19 pages.
Invitation to Pay Additional Fees; International Application No. PCT/US2018/042864; date of mailing Oct. 9, 2018; 12 pages.
Invitation to pay additional fees; International Application No. PCT/US2018/042866; date of mailing Oct. 9, 2018; 12 pages.

* cited by examiner

*Primary Examiner* — Charles I Boyer
(74) *Attorney, Agent, or Firm* — Gregory S. Darley-Emerson

(57) ABSTRACT

A composition including a siloxane polymer. A method of treating and/or cleaning a situs using the same.

14 Claims, No Drawings

POLYETHYLENE GLYCOL-BASED LAUNDRY DETERGENT COMPRISING FUNCTIONALIZED SILOXANE POLYMERS

FIELD OF THE INVENTION

The present disclosure relates to functionalized siloxane polymers, compositions and systems comprising functionalized siloxane polymers and methods of making and using the same. The compositions provide care to treated substrates and have a good environmental profile.

BACKGROUND OF THE INVENTION

Functionalized silicones polymers provide numerous benefits including fabric softness, hair conditioning, fabric anti-wrinkle control, shape maintenance, stain control, and color care. Currently, sustainable materials are highly desired as they typically require less energy to make, lower levels of raw materials and/or easier to dispose of.

The objective of the present invention is to develop a treatment composition that provides fabric softness, fabric anti-wrinkle control, shape maintenance, stain control, and/or color care and that have a good environmental profile.

SUMMARY OF THE INVENTION

The present disclosure relates to functionalized siloxane polymers, compositions and systems comprising functionalized siloxane polymers and methods of making and using the same. Such functionalized siloxane polymers are sustainable yet the primary performance benefits of such functionalized siloxane polymers, for example, the ability to impart look and/or feel benefits to a situs, are maintained or even improved. Methods of using such functionalized siloxane polymers including contacting a situs, such as a fabric with such functionalized siloxane polymers. The compositions comprising the siloxane polymers present improved biodegradability as compared to traditional siloxane polymers.

DETAILED DESCRIPTION OF THE INVENTION

Definitions

As used herein, the term "cleaning composition" includes any composition that helps removing dirt from items. The composition can be in any physical form including solid and liquid. Preferably the compositions of the invention are cleaning or treatment fabric compositions.

As used herein, the term "fabric care composition" includes, unless otherwise indicated, fabric softening compositions, fabric enhancing compositions, fabric freshening compositions and combinations thereof. The compositions can be in any physical form, liquid, solid, etc or as part of sheets such as dryer or washing machine added sheets, dry and wetted wipes, etc.

As used herein, the articles such as "a" and "an" when used in a claim, are understood to mean one or more of what is claimed or described.

As used herein, the terms "include", "includes" and "including" are meant to be synonymous with the phrase "including but not limited to".

As used herein, the term "solid" includes granular, powder, beads, bar and tablet product forms.

As used herein, the term "situs" includes paper products, fabrics, garments, hard surfaces, hair and skin.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Functionalized Silicones and Compositions Comprising Same

A) A composition comprising a siloxane polymer comprising one or more repeat units having the structure of Formula (I):

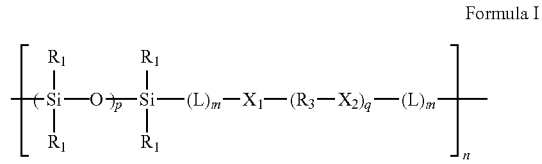

Formula I wherein:
a) each L is a linking bivalent alkylene radical, preferably each L is independently selected from the group consisting of

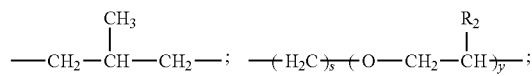

—$(CH_2)_s$—; and combinations thereof, more preferably at least one L is —$(CH_2)_s$—
wherein
each $R_2$ is independently selected from the group consisting of H, $C_1$-$C_4$ alkyl, substituted alkyl, aryl, substituted aryl, and combinations thereof; preferably H or $C_1$-$C_4$ alkyl, most preferably H or methyl, especially methyl.
each s is independently an integer of from 1 to about 20, preferably each s is independently an integer of from 2 to about 12;
each y is independently an integer of from 1 to about 100, preferably each y is independently an integer of from 1 to about 20, more preferably y is independently an integer of from 1 to about 10;
b) each $X_1$ and $X_2$ is independently selected from the group consisting of

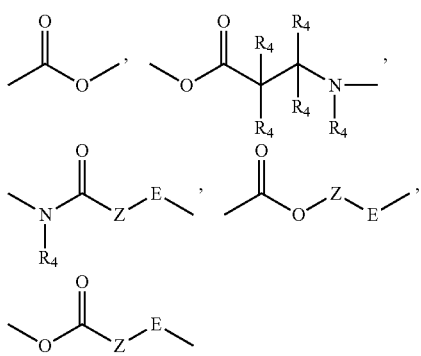

E=electron withdrawing group, preferably E is selected from the group consisting of N, O, S, a halide, an aryl moiety and an alkene moiety; or from the group consisting of O, S, a halide, an aryl moiety and an alkene moiety;

each of $R_4$ moiety is independently selected from the group consisting of H, $C_1$-$C_{32}$ alkyl, $C_1$-$C_{32}$ substituted alkyl, $C_6$-$C_{32}$ aryl, $C_5$-$C_{32}$ substituted aryl, $C_6$-$C_{32}$ alkylaryl, $C_6$-$C_{32}$ substituted alkylaryl; and each Z is independently selected from the group consisting of:

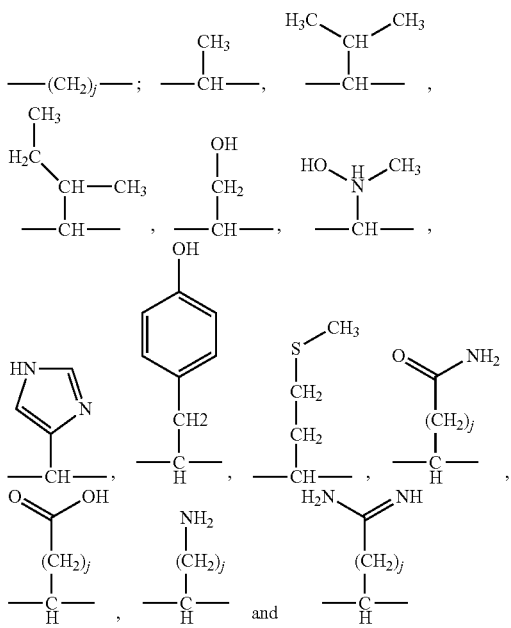

the index j is an integer from 1-32, preferably j is an integer form 1-10, more preferably j is an integer from 2 to 8, most preferably j in an integer from 2 to 4; or each Z is independently selected from the group consisting of $C_1$-$C_{32}$ alkylene, $C_1$-$C_{32}$ substituted alkylene, $C_6$-$C_{32}$ aryl, $C_5$-$C_{32}$ substituted aryl, $C_6$-$C_{32}$ alkylenearyl, and $C_5$-$C_{32}$ substituted alkylenearyl, preferably Z is $C_1$-$C_{32}$ alkylene or $C_1$-$C_{32}$ substituted alkylene, most preferably Z is selected from $C_1$-$C_4$ alkylene or $C_1$-$C_4$ substituted alkylene.

c) each $R_1$ is independently selected from the group consisting of H, OH, $C_1$-$C_{32}$ alkyl, $C_1$-$C_{32}$ substituted alkyl, $C_6$-$C_{32}$ aryl, $C_5$-$C_{32}$ substituted aryl, $C_6$-$C_{32}$ alkylaryl, $C_6$-$C_{32}$ substituted alkylaryl, $C_1$-$C_{32}$ alkoxy and $C_1$-$C_{32}$ substituted alkoxy; preferably each $R_1$ is independently selected from the group consisting of H, OH, $C_1$-$C_{16}$ alkyl, $C_1$-$C_4$ alkoxy, a benzyl moiety and a phenylpropyl moiety, more preferably each $R_1$ is independently selected from the group consisting of H, OH, $C_1$ alkyl, $C_1$ alkoxy, most preferably $R_1$ is $C_1$ alkyl;

d) each $R_3$ is independently selected from the group consisting of $C_1$-$C_{32}$ alkylene, $C_1$-$C_{32}$ substituted alkylene, $C_6$-$C_{32}$ aryl, $C_5$-$C_{32}$ substituted aryl, $C_6$-$C_{32}$ alkylenearyl, and $C_5$-$C_{32}$ substituted alkylenearyl, when $R_3$ moiety comprises two or more carbon atoms said $R_3$ moiety may optionally but preferentially be interrupted by a hetero atom selected from the group consisting of N, O and S and combinations thereof; preferably the R3 moiety is interrupted by N, more preferably R3 is a C4-C12 alkylene interrupted by N.

e) each index m is one or zero; or one or zero with the proviso that when $X_1$ and/or $X_2$ is oxygen the index m for the L moiety that is immediately adjacent to said $X_1$ and/or $X_2$ is 0;

f) each q is 1 or zero;

g) each index p is an integer of from about 2 to about 1000, preferably p is an integer from about 10 to about 500, more preferably p is an integer from about 20 to about 200; and h) the index n is an integer of from about 1 to about 50, preferably index n is an integer of from about 2 to about 20; and a surfactant, preferably said surfactant is selected from the group consisting of an anionic surfactant, a nonionic surfactant, a cationic surfactant, an amphoteric surfactant and mixtures thereof, more preferably said surfactant is selected from the group consisting of a linear or branched alkyl benzene sulfonate, an alkyl sulfate, an alkyl ethoxy sulfate, an alkyl ethoxylate, an alkyl glyceryl sulfonate, a quaternary ammonium surfactant, preferably said quaternary ammonium surfactant is an ester quaternary ammonium compound, and mixtures thereof is disclosed.

The siloxane polymer of the composition of the invention comprises a moiety with a cleavable bond that promotes the degradation of the polymer when is exposed to the environment. Without being by theory, it is believed that the hydrophobicity of the polymer changes and the polymer is prone to degradation by esterases enzymes readily available in the environment.

Preferably each $X_1$ and $X_2$ is independently selected from the group consisting of

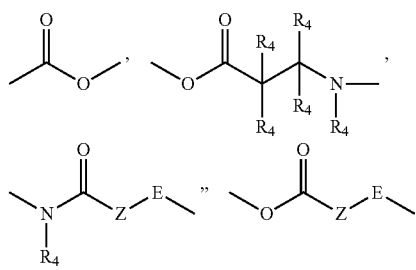

each Z is independently selected from the group consisting of C1-C32 alkylene, C1-C32 substituted alkylene, C6-C32 aryl, C5-C32 substituted aryl, C6-C32 alkylenearyl, and C5-C32 substituted alkylenearyl, preferably Z is C1-C32 alkylene or C1-C32 substituted alkylene, most preferably Z is selected from C1-C4 alkylene or C1-C4 substituted alkylene and m is 1.

Preferably each $X_1$ and $X_2$ is independently selected from the group consisting of

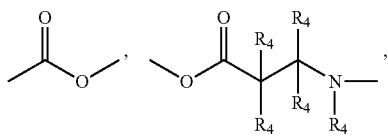

Siloxane polymers having $X_1$ and/or $X_2$ selected from the above group biodegrade easily.

Even more preferably each $X_1$ and $X_2$ is independently selected from the group consisting of

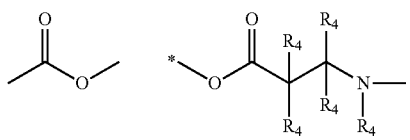

* denotes the side used to be attached to the linking radical (L).

Preferably, $R_4$ is independently hydrogen or methyl.

Especially preferred are siloxane polymers in which each R1 is independently selected from the group consisting of H, OH, $C_1$ alkyl, $C_1$ alkoxy, preferably $R_1$ is $C_1$ alkyl; each R3 is independently selected from the group consisting of C4-C12 alkylene preferably interrupted by N; each L is independently selected from (CH2)s, each s is independently an integer of from 2 to about 12; each R2 each $X_1$ and $X_2$ is independently selected from the group consisting of

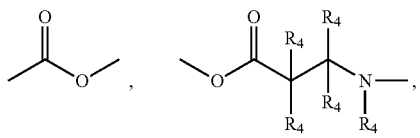

and preferably $R_4$ is independently a hydrogen or methyl; m is one; each index p is an integer from about 20 to about 200; each index n is an integer of from about 2 to about 20.

B) A composition according Paragraph A) is disclosed, said composition comprising, based on total composition weight, from about 0.2% to about 10% of said siloxane polymer, preferably said composition comprises, based on total composition weight, from about 0.3% to about 8% of said siloxane polymer, more preferably said composition comprises, based on total composition weight, from about 0.5% to about 5% of said siloxane polymer.

C) A composition according Paragraphs A) through B) is disclosed, said composition comprising an adjunct ingredient selected from the group consisting of ingredient selected from the group consisting of surfactants, color care polymers, deposition aids, surfactant boosting polymers, pH adjusters, product color stabilizers, preservatives, solvents, builders, chelating agents, dye transfer inhibiting agents, dispersants, enzymes, and enzyme stabilizers, catalytic materials, bleach, bleach activators, polymeric dispersing agents, clay soil removal/anti-redeposition agents, brighteners, suds suppressors, dyes, UV absorbers, perfume, an additional perfume delivery system, structure elasticizing agents, thickeners/structurants, fabric softeners, carriers, hydrotropes, oligoamines, processing aids, hueing agents, pigments and mixtures thereof.

D) A composition according Paragraphs A) through C) is disclosed, said composition comprising a deposition aid, preferably said deposition aid comprises a cationic polymer, preferably said cationic polymer is a cationic polymer having a net cationic charge density of from about 0.2 meq/g to about 20 meq/g.

E) A composition according to Paragraphs A) through D), said composition having a pH of from about 2 to about 4, preferably a pH of from about 2 to about 3.7, more preferably a pH from about 2 to about 3.5, preferably said composition comprises an ester quaternary ammonium compound, more preferably said composition comprises, based on total composition weight, from about 3% to about 25%, preferably from about 4% to about 20%, more preferably from about 5% to about 15%, most preferably from about 7% to about 12% of said ester quaternary ammonium compound. When the pH of the composition is as stated above, the compounds such as the aforementioned ester quaternary ammonium compound are stable and become increasingly stable with the as the pH range is focused within the preferred ranges.

The composition of the invention can be in liquid or solid form. Preferably, if the composition is in liquid form the pH of the neat composition (as measured at 20° C.) is from about 2 to about 4. This pH range provides improved stability of the siloxane polymer. The composition of the invention can be in solid form, such as in the form of a laundry powder, preferably comprising an anionic surfactant, or in the form of a solid delivery agent, such as beads, or a sheet.

Preferably, the composition is in solid form. Preferably the composition is a laundry composition in powder form comprising from 8% to 15% by weight of the composition of anionic surfactant preferably selected from the group consisting of alkyl benzene sulphonate, alkyl ethoxylated sulphate and mixtures thereof and from 0.1% to 4% by weight of the composition of a non-ionic surfactant, preferably an alkyl ethoxylated alcohol.

Method of Use and Treated Situs

Compositions containing the siloxane polymer disclosed herein can be used to clean or treat a situs inter alia a surface or fabric. Typically, at least a portion of the situs is contacted with the composition of the invention, in neat form or diluted in a liquor, for example, a wash liquor and then the situs may be optionally washed and/or rinsed. In one aspect, a situs is optionally washed and/or rinsed, contacted with a particle according to the present invention or composition comprising said particle and then optionally washed and/or rinsed. For purposes of the present invention, washing includes but is not limited to, scrubbing, and mechanical agitation. The fabric may comprise any fabric capable of being laundered or treated in normal consumer use conditions. Liquors that may comprise the disclosed compositions are typically employed at concentrations of from about 500 ppm to about 15,000 ppm in solution. When the wash solvent is water, the water temperature typically ranges from about 5° C. to about 90° C. and, when the situs comprises a fabric, the water to fabric ratio is typically from about 1:1 to about 30:1.

A method of treating and/or cleaning a situs (preferably a fabric), said method comprising a.) optionally washing and/or rinsing said situs;
b.) contacting said situs with a composition according to Paragraphs A) through E); and
c.) optionally washing and/or rinsing said situs.

A situs treated with a composition according to Paragraphs A) through E) is disclosed.

Consumer Product Ingredients

While not essential for each consumer product embodiment of the present invention, the non-limiting list of consumer product ingredients illustrated hereinafter are suitable for use in Applicants' compositions and may be desirably incorporated in certain embodiments of the invention, for example to assist or enhance performance, for treatment of the substrate to be cleaned, or to modify the aesthetics of the composition as is the case with perfumes, colorants, dyes or the like. The precise nature of these consumer product ingredients, and levels of incorporation thereof, will depend on the physical form of the composition and the nature of the operation for which it is to be used. Suitable consumer product ingredients include, but are not limited to surfactants, color care polymers, deposition aids, surfactant boosting polymers, pH adjusters, product color stabilizers, preservatives, solvents, builders, chelating agents, dye transfer inhibiting agents, dispersants, enzymes, and enzyme stabilizers, catalytic materials, bleach, bleach activators, polymeric dispersing agents, clay soil removal/anti-redeposition agents, brighteners, suds suppressors, dyes, UV absorbers, perfume and perfume delivery systems, structure elasticizing agents, thickeners/structurants, fabric softeners, carriers, hydrotropes, oligoamines, processing aids, hueing agents, and/or pigments.

As stated, the consumer product ingredients are not essential for each consumer product embodiment of the present invention. Thus, certain embodiments of Applicants' compositions do not contain one or more of the following adjuncts materials: color care polymers, deposition aids, surfactant boosting polymers, pH adjusters, product color stabilizers, preservatives, solvents, builders, chelating agents, dye transfer inhibiting agents, dispersants, enzymes, and enzyme stabilizers, catalytic materials, bleach, bleach activators, polymeric dispersing agents, clay soil removal/anti-redeposition agents, brighteners, suds suppressors, dyes, UV absorbers, perfume and perfume delivery systems, structure elasticizing agents, thickeners/structurants, fabric softeners, carriers, hydrotropes, oligoamines, processing aids, hueing agents, and/or pigments. However, when one or more consumer product ingredients is present, such one or more consumer product ingredients may be present as detailed below.

Quaternary Ammonium Ester Softening Active

The composition of the present invention may comprise from 3.0% to 25.0% of a quaternary ammonium ester softening active (Fabric Softening Active, "FSA"). The term ester quaternary ammonium compound is synonymous with quaternary ammonium ester softening active. Preferably, the composition of the invention is a liquid fabric softener composition. In preferred liquid fabric softener compositions, the quaternary ammonium ester softening active is present at a level of from 4.0% to 20%, more preferably from 5.0% to 15%, even more preferably from 7.0% to 12% by weight of the composition. The level of quaternary ammonium ester softening active may depend of the desired concentration of total softening active in the composition (diluted or concentrated composition) and of the presence or not of other softening active.

Preferably the iodine value of the parent fatty acid from which the quaternary ammonium fabric softening active is formed is from 0 to 100, preferably from 10 to 60, more preferably 15 to 45.

Suitable quaternary ammonium ester softening actives include but are not limited to, materials selected from the group consisting of monoester quats, diester quats, triester quats and mixtures thereof. Preferably, the level of monoester quat is from 2.0% to 40.0%, the level of diester quat is from 40.0% to 98.0%, the level of triester quat is from 0.0% to 25.0% by weight of total quaternary ammonium ester softening active.

Said quaternary ammonium ester softening active may comprise compounds of the following formula:

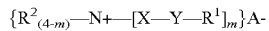

wherein:
m is 1, 2 or 3 with proviso that the value of each m is identical;
each $R^1$ is independently hydrocarbyl, or branched hydrocarbyl group, preferably $R^1$ is linear, more preferably $R^1$ is partially unsaturated linear alkyl chain;
each $R^2$ is independently a $C_1$-$C_3$ alkyl or hydroxyalkyl group, preferably $R^2$ is selected from methyl, ethyl, propyl, hydroxyethyl, 2-hydroxypropyl, 1-methyl-2-hydroxyethyl, poly($C_{2-3}$ alkoxy), polyethoxy, benzyl;
each X is independently $(CH_2)n$, $CH_2$—$CH(CH_3)$— or CH—$(CH_3)$—$CH_2$— and
each n is independently 1, 2, 3 or 4, preferably each n is 2;
each Y is independently —O—(O)C— or —C(O)—O—;
A- is independently selected from the group consisting of chloride, methylsulfate, and ethylsulfate, preferably A- is selected from the group consisting of chloride and methylsulfate;
with the proviso that when Y is —O—(O)C—, the sum of carbons in each $R^1$ is from 13 to 21, preferably from 13 to 19.

Examples of suitable quaternary ammonium ester softening actives are commercially available from KAO Chemicals under the trade name Tetranyl AT-1 and Tetranyl AT-7590, from Evonik under the tradename Rewoquat WE16 DPG, Rewoquat WE18, Rewoquat WE20, Rewoquat WE28, and Rewoquat 38 DPG, from Stepan under the tradename Stepantex GA90, Stepantex VR90, Stepantex VK90, Stepantex VA90, Stepantex DC90, Stepantex VL90A.

These types of agents and general methods of making them are disclosed in U.S. Pat. No. 4,137,180.

Additional Fabric Softening Active

The composition of the present invention may comprise from 0.01% to 10%, preferably from 0.1% to 10%, more preferably from 0.1% to 5% of additional fabric softening active. Suitable fabric softening actives, include, but are not limited to, materials selected from the group consisting of non-ester quaternary ammonium compounds, amines, fatty esters, sucrose esters, silicones, dispersible polyolefins, polysaccharides, fatty acids, softening oils, polymer latexes and combinations thereof.

Non-Ester Quaternary Ammonium Compounds:

Suitable non-ester quaternary ammonium compounds comprise compounds of the formula:

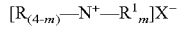

wherein each R comprises either hydrogen, a short chain $C_1$-$C_6$, in one aspect a $C_1$-$C_3$ alkyl or hydroxyalkyl group, for example methyl, ethyl, propyl, hydroxyethyl, poly($C_{2-3}$ alkoxy), polyethoxy, benzyl, or mixtures thereof; each m is 1, 2 or 3 with the proviso that the value of each m is the same; the sum of carbons in each $R^1$ may be $C_{12}$-$C_{22}$, with each $R^1$ being a hydrocarbyl, or substituted hydrocarbyl group; and $X^-$ may comprise any softener-compatible anion. The softener-compatible anion may comprise chloride, bromide, methylsulfate, ethylsulfate, sulfate, and nitrate. The softener-compatible anion may comprise chloride or methyl sulfate.

Non-limiting examples include dialkylenedimethylammonium salts such as dicanoladimethylammonium chloride, di(hard)tallowdimethylammonium chloride dicanoladimethylammonium methylsulfate, and mixtures thereof. An example of commercially available dialkylenedimethylammonium salts usable in the present invention is dioleyldimethylammonium chloride available from Witco Corporation under the trade name Adogen® 472 and dihardtallow dimethylammonium chloride available from Akzo Nobel Arquad 2HT75.

Amines:

Suitable amines include but are not limited to, materials selected from the group consisting of amidoesteramines, amidoamines, imidazoline amines, alkyl amines, and combinations thereof. Suitable ester amines include but are not limited to, materials selected from the group consisting of monoester amines, diester amines, triester amines and combinations thereof. Suitable amidoamines include but are not limited to, materials selected from the group consisting of monoamido amines, diamido amines and combinations thereof. Suitable alkyl amines include but are not limited to, materials selected from the group consisting of mono alkylamines, dialkyl amines quats, trialkyl amines, and combinations thereof.

Fatty Acid:

The composition may comprise a fatty acid, such as a free fatty acid as fabric softening active. The term "fatty acid" is used herein in the broadest sense to include unprotonated or protonated forms of a fatty acid. One skilled in the art will readily appreciate that the pH of an aqueous composition will dictate, in part, whether a fatty acid is protonated or unprotonated. The fatty acid may be in its unprotonated, or salt form, together with a counter ion, such as, but not limited to, calcium, magnesium, sodium, potassium, and the like. The term "free fatty acid" means a fatty acid that is not bound to another chemical moiety (covalently or otherwise).

The fatty acid may include those containing from 12 to 25, from 13 to 22, or even from 16 to 20, total carbon atoms, with the fatty moiety containing from 10 to 22, from 12 to 18, or even from 14 (mid-cut) to 18 carbon atoms.

The fatty acids may be derived from (1) an animal fat, and/or a partially hydrogenated animal fat, such as beef tallow, lard, etc.; (2) a vegetable oil, and/or a partially hydrogenated vegetable oil such as canola oil, safflower oil, peanut oil, sunflower oil, sesame seed oil, rapeseed oil, cottonseed oil, corn oil, soybean oil, tall oil, rice bran oil, palm oil, palm kernel oil, coconut oil, other tropical palm oils, linseed oil, tung oil, castor oil, etc.; (3) processed and/or bodied oils, such as linseed oil or tung oil via thermal, pressure, alkali-isomerization and catalytic treatments; (4) combinations thereof, to yield saturated (e.g. stearic acid), unsaturated (e.g. oleic acid), polyunsaturated (linoleic acid), branched (e.g. isostearic acid) or cyclic (e.g. saturated or unsaturated disubstituted cyclopentyl or cyclohexyl derivatives of polyunsaturated acids) fatty acids.

Mixtures of fatty acids from different fat sources can be used.

The cis/trans ratio for the unsaturated fatty acids may be important, with the cis/trans ratio (of the C18:1 material) being from at least 1:1, at least 3:1, from 4:1 or even from 9:1 or higher.

Branched fatty acids such as isostearic acid are also suitable since they may be more stable with respect to oxidation and the resulting degradation of color and odor quality. The fatty acid may have an iodine value from 0 to 140, from 50 to 120 or even from 85 to 105. Polysaccharides:

The composition may comprise a polysaccharide as a fabric softening active, such as cationic starch. Suitable cationic starches for use in the present compositions are commercially-available from Cerestar under the trade name C*BOND® and from National Starch and Chemical Company under the trade name CATO® 2A.

Sucrose Esters:

The composition may comprise a sucrose esters as a fabric softening active. Sucrose esters are typically derived from sucrose and fatty acids. Sucrose ester is composed of a sucrose moiety having one or more of its hydroxyl groups esterified.

Sucrose is a disaccharide having the following formula:

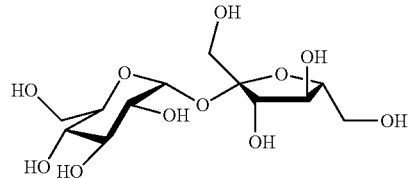

Alternatively, the sucrose molecule can be represented by the formula: $M(OH)_8$, wherein M is the disaccharide backbone and there are total of 8 hydroxyl groups in the molecule.

Thus, sucrose esters can be represented by the following formula:

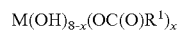

$M(OH)_{8-x}(OC(O)R^1)_x$ wherein x is the number of hydroxyl groups that are esterified, whereas (8-x) is the hydroxyl groups that remain unchanged; x is an integer selected from 1 to 8, alternatively from 2 to 8, alternatively from 3 to 8, or from 4 to 8; and $R^1$ moieties are independently selected from $C_1$-$C_{22}$ alkyl or $C_1$-$C_{30}$ alkoxy, linear or branched, cyclic or acyclic, saturated or unsaturated, substituted or unsubstituted.

The $R^1$ moieties may comprise linear alkyl or alkoxy moieties having independently selected and varying chain length. For example, $R^1$ may comprise a mixture of linear alkyl or alkoxy moieties wherein greater than 20% of the linear chains are $C_{18}$, alternatively greater than 50% of the linear chains are $C_{18}$, alternatively greater than 80% of the linear chains are $C_{18}$.

The $R^1$ moieties may comprise a mixture of saturate and unsaturated alkyl or alkoxy moieties. The iodine value (IV) of the sucrose esters suitable for use herein ranges from 1 to 150, or from 2 to 100, or from 5 to 85. The $R^1$ moieties may be hydrogenated to reduce the degree of unsaturation. In the case where a higher IV is preferred, such as from 40 to 95, then oleic acid and fatty acids derived from soybean oil and canola oil are suitable starting materials.

The unsaturated $R^1$ moieties may comprise a mixture of "cis" and "trans" forms the unsaturated sites. The "cis"/"trans" ratios may range from 1:1 to 50:1, or from 2:1 to 40:1, or from 3:1 to 30:1, or from 4:1 to 20:1.

Dispersible Polyolefins and Latexes:

Generally, all dispersible polyolefins that provide fabric softening benefits can be used as fabric softening active in the present invention. The polyolefins can be in the form of waxes, emulsions, dispersions or suspensions.

The polyolefin may be chosen from a polyethylene, polypropylene, or combinations thereof. The polyolefin may be at least partially modified to contain various functional groups, such as carboxyl, alkylamide, sulfonic acid or amide groups. The polyolefin may be at least partially carboxyl modified or, in other words, oxidized.

Non-limiting examples of fabric softening active include dispersible polyethylene and polymer latexes. These agents can be in the form of emulsions, latexes, dispersions, suspensions, and the like. In one aspect, they are in the form of an emulsion or a latex. Dispersible polyethylenes and polymer latexes can have a wide range of particle size diameters ($\chi_{50}$) including but not limited to from 1 nm to 100 µm; alternatively, from 10 nm to 10 µm. As such, the particle sizes of dispersible polyethylenes and polymer latexes are generally, but without limitation, smaller than silicones or other fatty oils.

Generally, any surfactant suitable for making polymer emulsions or emulsion polymerizations of polymer latexes can be used as emulsifiers for polymer emulsions and latexes used as fabric softeners active in the present invention. Suitable surfactants include anionic, cationic, and nonionic surfactants, and combinations thereof. In one aspect, such surfactants are nonionic and/or anionic surfactants. In one aspect, the ratio of surfactant to polymer in the fabric softening active is 1:5, respectively.

Additional Silicone

The fabric softening composition may comprise a silicone in addition to the siloxane polymer. The siloxane polymer comprises a backbone that is cleavable. Suitable levels of silicone may comprise from about 0.1% to about 70%, alternatively from about 0.3% to about 40%, alternatively from about 0.5% to about 30%, alternatively from about 1% to about 20% by weight of the composition. Useful silicones can be any silicone comprising compound. In one embodiment, the silicone polymer is selected from the group consisting of cyclic silicones, polydimethylsiloxanes, aminosilicones, cationic silicones, silicone polyethers, silicone resins, silicone urethanes, and mixtures thereof. The silicone may be a polydialkylsilicone, alternatively a polydimethyl silicone (polydimethyl siloxane or "PDMS"), or a derivative thereof. The silicone may be chosen from an aminofunctional silicone, amino-polyether silicone, alkyloxylated silicone, cationic silicone, ethoxylated silicone, propoxylated silicone, ethoxylated/propoxylated silicone, quaternary silicone, or combinations thereof.

Surfactants

In some examples, such as laundry detergents, the surfactant comprises one or more anionic surfactants. In some examples, the additional surfactant may consist essentially of, or even consist of one or more anionic surfactants.

Specific, non-limiting examples of suitable anionic surfactants include any conventional anionic surfactant. This may include a sulfate detersive surfactant, for e.g., alkoxylated and/or non-alkoxylated alkyl sulfate materials, and/or sulfonic detersive surfactants, e.g., alkyl benzene sulfonates.

Alkoxylated alkyl sulfate materials comprise ethoxylated alkyl sulfate surfactants, also known as alkyl ether sulfates or alkyl polyethoxylate sulfates. Examples of ethoxylated alkyl sulfates include water-soluble salts, particularly the alkali metal, ammonium and alkylolammonium salts, of organic sulfuric compounds having in their molecular structure an alkyl group containing from about 8 to about 30 carbon atoms and a sulfonic acid and its salts. (Included in the term "alkyl" is the alkyl portion of acyl groups. In some examples, the alkyl group contains from about 15 carbon atoms to about 30 carbon atoms. In other examples, the alkyl ether sulfate surfactant may be a mixture of alkyl ether sulfates, said mixture having an average (arithmetic mean) carbon chain length within the range of about 12 to 30 carbon atoms, and in some examples an average carbon chain length of about 12-15 carbon atoms, and an average (arithmetic mean) degree of ethoxylation of from about 1 mol to 4 mols of ethylene oxide, and in some examples an average (arithmetic mean) degree of ethoxylation of about 1.8 mols to about 4 mols of ethylene oxide. In further examples, the alkyl ether sulfate surfactant may have a carbon chain length between about 10 carbon atoms to about 18 carbon atoms, and a degree of ethoxylation of from about 1 to about 6 mols of ethylene oxide. In yet further examples, the alkyl ether sulfate surfactant may contain a peaked ethoxylate distribution, Non-ethoxylated alkyl sulfates may also be added to the disclosed cleaning compositions and used as an anionic surfactant component. Examples of non-alkoxylated, e.g., non-ethoxylated, alkyl sulfate surfactants include those produced by the sulfation of higher $C_8$-$C_{20}$ fatty alcohols. In some examples, primary alkyl sulfate surfactants have the general formula: $ROSO_3^-M^+$, wherein R is typically a linear $C_8$-$C_{20}$ hydrocarbyl group, which may be straight chain or branched chain, and M is a water-solubilizing cation. In some examples, R is a $C_{10}$-$C_{15}$ alkyl, and M is an alkali metal. In other examples, R is a $C_{12}$-$C_{14}$ alkyl and M is sodium.

Other useful anionic surfactants can include the alkali metal salts of alkyl benzene sulfonates, in which the alkyl group contains from about 9 to about 15 carbon atoms, in straight chain (linear) or branched chain configuration. In some examples, the alkyl group is linear. Such linear alkylbenzene sulfonates are known as "LAS." In other examples, the linear alkylbenzene sulfonate may have an average number of carbon atoms in the alkyl group of from about 11 to 14. In a specific example, the linear straight chain alkyl benzene sulfonates may have an average number of carbon atoms in the alkyl group of about 11.8 carbon atoms, which may be abbreviated as C11.8 LAS.

Suitable alkyl benzene sulphonate (LAS) may be obtained, by sulphonating commercially available linear alkyl benzene (LAB); suitable LAB includes low 2-phenyl LAB, such as those supplied by Sasol under the tradename Isochem® or those supplied by Petresa under the tradename Petrelab®, other suitable LAB include high 2-phenyl LAB, such as those supplied by Sasol under the tradename Hyblene®. A suitable anionic detersive surfactant is alkyl benzene sulphonate that is obtained by DETAL catalyzed process, although other synthesis routes, such as HF, may also be suitable. A magnesium salt of LAS may be used.

The detersive surfactant may be a mid-chain branched detersive surfactant preferably a mid-chain branched anionic detersive surfactant, more preferably a mid-chain branched alkyl sulphate and/or a mid-chain branched alkyl benzene sulphonate, for example, a mid-chain branched alkyl sulphate. The mid-chain branches may be $C_{1-4}$ alkyl groups, typically methyl and/or ethyl groups.

Other anionic surfactants useful herein are the water-soluble salts of: paraffin sulfonates and secondary alkane sulfonates containing from about 8 to about 24 (and in some examples about 12 to 18) carbon atoms; alkyl glyceryl ether sulfonates, especially those ethers of $C_{8-18}$ alcohols (e.g., those derived from tallow and coconut oil). Mixtures of the alkylbenzene sulfonates with the above-described paraffin sulfonates, secondary alkane sulfonates and alkyl glyceryl ether sulfonates are also useful. Further suitable anionic surfactants include methyl ester sulfonates and alkyl ether carboxylates.

Nonionic Surfactants

The composition of the invention may comprise from about 0.1% to about 40%, by weight of the composition ofone or more nonionic surfactants. The composition may comprise from about 0.1% to about 15%, by weight of the composition, of an additional surfactant selected from one or more nonionic surfactants. The composition may comprise from about 0.3% to about 10%, by weight of the composition, of asurfactant selected from one or more nonionic surfactants.

Suitable nonionic surfactants useful herein can comprise any conventional nonionic surfactant. These can include, for e.g., alkoxylated fatty alcohols and amine oxide surfactants. In some examples, the cleaning compositions may contain an ethoxylated nonionic surfactant. The nonionic surfactant may be selected from the ethoxylated alcohols and ethoxylated alkyl phenols of the formula $R(OC_2H_4)_nOH$, wherein R is selected from the group consisting of aliphatic hydrocarbon radicals containing from about 8 to about 17 carbon atoms and alkyl phenyl radicals in which the alkyl groups contain from about 8 to about 12 carbon atoms, and the average value of n is from about 5 to about 15. The nonionic surfactant may be selected from ethoxylated alcohols having an average of about 24 carbon atoms in the alcohol and an average degree of ethoxylation of about 9 moles of ethylene oxide per mole of alcohol.

Other non-limiting examples of nonionic surfactants useful herein include: $C_8$-$C_{18}$ alkyl ethoxylates, such as, NEODOL® nonionic surfactants from Shell; $C_6$-$C_{12}$ alkyl phenol alkoxylates where the alkoxylate units may be ethyleneoxy units, propyleneoxy units, or a mixture thereof; $C_{12}$-$C_{18}$ alcohol and $C_6$-$C_{12}$ alkyl phenol condensates with ethylene oxide/propylene oxide block polymers such as Pluronic® from BASF; $C_{14}$-$C_{22}$ mid-chain branched alcohols, alkylpolysaccharides, polyhydroxy fatty acid amides and ether capped poly(oxyalkylated) alcohol surfactants Suitable nonionic detersive surfactants also include alkyl polyglucoside and alkyl alkoxylated alcohol. Suitable nonionic surfactants also include those sold under the tradename Lutensol® from BASF.

The nonionic surfactant may be selected from alkyl alkoxylated alcohols, such as a $C_{8-18}$ alkyl alkoxylated alcohol, for example, a $C_{8-18}$ alkyl ethoxylated alcohol. The alkyl alkoxylated alcohol may have an average degree of alkoxylation of from about 1 to about 50, or from about 1 to about 30, or from about 1 to about 20, or from about 1 to about 10. In certain aspects, the alkyl alkoxylated alcohol is a $C_{8-18}$ alkyl ethoxylated alcohol having an average degree of ethoxylation of from about 1 to about 10, or from about 1 to about 7, or from about 1 to about 5, or from about 3 to about 7. The alkyl alkoxylated alcohol can be linear or branched, substituted or unsubstituted.

Enzymes

The compositions described herein may comprise one or more enzymes which provide cleaning performance and/or fabric care benefits. Examples of suitable enzymes include, but are not limited to, hemicellulases, peroxidases, proteases, cellulases, xylanases, lipases, xyloglucanase, phospholipases, esterases, cutinases, pectinases, mannanases, pectate lyases, keratinases, reductases, oxidases, phenoloxidases, lipoxygenases, ligninases, pullulanases, tannases, pentosanases, malanases, β-glucanases, arabinosidases, hyaluronidase, chondroitinase, laccase, and amylases, or mixtures thereof. A typical combination is an enzyme cocktail that may comprise, for example, a protease and lipase in conjunction with amylase. When present in a detergent composition, the aforementioned additional enzymes may be present at levels from about 0.00001% to about 2%, from about 0.0001% to about 1% or even from about 0.001% to about 0.5% enzyme protein by weight of the detergent composition.

Preferred enzymes may include a protease. Suitable proteases include metalloproteases and serine proteases, including neutral or alkaline microbial serine proteases, such as subtilisins (EC 3.4.21.62). Suitable proteases include those of animal, vegetable or microbial origin. Suitable protease may be of microbial origin. The suitable proteases include chemically or genetically modified mutants of the aforementioned suitable proteases. The suitable protease may be a serine protease, such as an alkaline microbial protease or/and a trypsin-type protease.

Suitable commercially available protease enzymes include those sold under the trade names Alcalase®, Savinase®, Primase®, Durazym®, Polarzyme®, Kannase®, Liquanase®, Liquanase Ultra®, Savinase Ultra®, Ovozyme®, Neutrase®, Everlase® and Esperase® by Novozymes A/S (Denmark), those sold under the tradename Maxatase®, Maxacal®, Maxapem®, Properase®, Purafect®, Purafect Prime®, Purafect Ox®, FN3®, FN4®, Excellase® and Purafect OXP® by Genencor International, those sold under the tradename Opticlean® and Optimase® by Solvay Enzymes, those available from Henkel/Kemira, namely BLAP, BLAP X and BLAP F49—all from Henkel/Kemira; and KAP from Kao.

Suitable alpha-amylases include those of bacterial or fungal origin. Chemically or genetically modified mutants (variants) are included. A preferred alkaline alpha-amylase is derived from a strain of *Bacillus*, such as *Bacillus licheniformis, Bacillus amyloliquefaciens, Bacillus stearothermophilus, Bacillus subtilis*, or other *Bacillus* sp.

Suitable commercially available alpha-amylases include DURAMYL®, LIQUEZYME®, TERMAMYL®, TERMAMYL ULTRA®, NATALASE®, SUPRAMYL®, STAINZYME®, STAINZYME PLUS®, FUNGAMYL® and BAN® (Novozymes A/S, Bagsvaerd, Denmark), KEMZYM® AT 9000 Biozym Biotech Trading GmbH Wehlistrasse 27b A-1200 Wien Austria, RAPIDASE®, PURASTAR®, ENZYSIZE®, OPTISIZE HT PLUS®, POWERASE® and PURASTAR OXAM® (Genencor International Inc., Palo Alto, Calif.) and KAM® (Kao, 14-10 Nihonbashi Kayabacho, 1-chome, Chuo-ku Tokyo 103-8210, Japan). In one aspect, suitable amylases include NATALASE®, STAINZYME® and STAINZYME PLUS® and mixtures thereof.

In one aspect, such enzymes may be selected from the group consisting of: lipases, including "first cycle lipases". Preferred lipases would include those sold under the tradenames Lipex® and Lipolex®.

In one aspect, other preferred enzymes include microbial-derived endoglucanases. Suitable endoglucanases are sold under the tradenames Celluclean® and Whitezyme® (Novozymes A/S, Bagsvaerd, Denmark).

Other preferred enzymes include pectate lyases sold under the tradenames Pectawash®, Pectaway®, Xpect® and mannanases sold under the tradenames Mannaway® (all from Novozymes A/S, Bagsvaerd, Denmark), and Purabrite® (Genencor International Inc., Palo Alto, Calif.).

Enzyme Stabilizing System

The enzyme-containing compositions described herein may optionally comprise from about 0.001% to about 10%, in some examples from about 0.005% to about 8%, and in other examples, from about 0.01% to about 6%, by weight of the composition, of an enzyme stabilizing system. The enzyme stabilizing system can be any stabilizing system which is compatible with the detersive enzyme. Such a system may be inherently provided by other formulation actives, or be added separately, e.g., by the formulator or by a manufacturer of detergent-ready enzymes. Such stabilizing systems can, for example, comprise calcium ion, boric acid, propylene glycol, short chain carboxylic acids, boronic acids, chlorine bleach scavengers and mixtures thereof, and are designed to address different stabilization problems depending on the type and physical form of the cleaning composition.

Builders

The cleaning compositions of the present invention may optionally comprise a builder. Built cleaning compositions typically comprise at least about 1% builder, based on the total weight of the composition. Liquid cleaning compositions may comprise up to about 10% builder, and in some examples, up to about 8% builder, of the total weight of the composition. Granular cleaning compositions may comprise up to about 30% builder, and in some examples, up to about 5% builder, by weight of the composition.

Builders selected from aluminosilicates (e.g., zeolite builders, such as zeolite A, zeolite P, and zeolite MAP) and silicates assist in controlling mineral hardness in wash water, especially calcium and/or magnesium, or to assist in the removal of particulate soils from surfaces. Suitable builders may be selected from the group consisting of phosphates, such as polyphosphates (e.g., sodium tri-polyphosphate), especially sodium salts thereof; carbonates, bicarbonates, sesquicarbonates, and carbonate minerals other than sodium carbonate or sesquicarbonate; organic mono-, di-, tri-, and tetracarboxylates, especially water-soluble nonsurfactant carboxylates in acid, sodium, potassium or alkanolammonium salt form, as well as oligomeric or water-soluble low molecular weight polymer carboxylates including aliphatic and aromatic types; and phytic acid. Additional suitable builders may be selected from citric acid, lactic acid, fatty acid, polycarboxylate builders, for example, copolymers of acrylic acid, copolymers of acrylic acid and maleic acid, and copolymers of acrylic acid and/or maleic acid, and other suitable ethylenic monomers with various types of additional functionalities. Also suitable for use as builders herein are synthesized crystalline ion exchange materials or hydrates thereof having chain structure and a composition represented by the following general anhydride form: $x(M_2O).ySiO_2.zM'O$ wherein M is Na and/or K, M' is Ca and/or Mg; y/x is 0.5 to 2.0; and z/x is 0.005 to 1.0

Alternatively, the composition may be substantially free of builder.

Structurant/Thickeners i. Bacterial Cellulose

The fluid detergent composition may also comprise from about 0.005% to about 1% by weight of a bacterial cellulose network. The term "bacterial cellulose" encompasses any type of cellulose produced via fermentation of a bacteria of the genus *Acetobacter* such as CELLULON® by CPKelco U.S. and includes materials referred to popularly as microfibrillated cellulose, reticulated bacterial cellulose, and the like. In one aspect, said fibres have cross sectional dimensions of 1.6 nm to 3.2 nm by 5.8 nm to 133 nm. Additionally, the bacterial cellulose fibres have an average microfibre length of at least about 100 nm, or from about 100 to about 1,500 nm. In one aspect, the bacterial cellulose microfibres have an aspect ratio, meaning the average microfibre length divided by the widest cross sectional microfibre width, of from about 100:1 to about 400:1, or even from about 200:1 to about 300:1.

ii. Coated Bacterial Cellulose

The bacterial cellulose may be at least partially coated with a polymeric thickener. The at least partially coated bacterial cellulose may comprise from about 0.1% to about 5%, or even from about 0.5% to about 3%, by weight of bacterial cellulose; and from about 10% to about 90% by weight of the polymeric thickener. Suitable bacterial cellulose may include the bacterial cellulose described above and suitable polymeric thickeners include: carboxymethylcellulose, cationic hydroxymethylcellulose, and mixtures thereof.

iii. Cellulose Fibers Non-Bacterial Cellulose Derived

The composition may further comprise from about 0.01 to about 5% by weight of the composition of a cellulosic fiber. Said cellulosic fiber may be extracted from vegetables, fruits or wood. Commercially available examples are Avicel® from FMC, Citri-Fi from Fiberstar or Betafib from Cosun.

iv. Non-Polymeric Crystalline Hydroxyl-Functional Materials

The composition may further comprise from about 0.01 to about 1% by weight of the composition of a non-polymeric crystalline, hydroxyl functional structurant. Said non-polymeric crystalline, hydroxyl functional structurants generally may comprise a crystallizable glyceride which can be pre-emulsified to aid dispersion into the final fluid detergent composition. Crystallizable glycerides may include hydrogenated castor oil or "HCO" or derivatives thereof, provided that it is capable of crystallizing in the liquid detergent composition.

v. Polymeric Structuring Agents

Fluid detergent compositions of the present invention may comprise from about 0.01% to about 5% by weight of a naturally derived and/or synthetic polymeric structurant. Examples of naturally derived polymeric structurants of use in the present invention include: hydroxyethyl cellulose, hydrophobically modified hydroxyethyl cellulose, carboxymethyl cellulose, polysaccharide derivatives and mixtures thereof. Suitable polysaccharide derivatives include: pectine, alginate, arabinogalactan (gum Arabic), carrageenan, gellan gum, xanthan gum, guar gum and mixtures thereof. Examples of synthetic polymeric structurants of use in the present invention include: polycarboxylates, polyacrylates, hydrophobically modified ethoxylated urethanes, hydrophobically modified non-ionic polyols and mixtures thereof. Said polycarboxylate polymer may be a polyacrylate, polymethacrylate or mixtures thereof. The polyacrylate may be a copolymer of unsaturated mono- or di-carbonic acid and $C_1$-$C_{30}$ alkyl ester of the (meth)acrylic acid. Said copolymers are available from Noveon inc under the tradename Carbopol Aqua 30.

Cellulosic polymer—The consumer products of the present invention may also include one or more cellulosic polymers including those selected from alkyl cellulose, alkyl alkoxyalkyl cellulose, carboxyalkyl cellulose, alkyl carboxyalkyl cellulose. The cellulosic polymers may be selected from the group comprising carboxymethyl cellulose, methyl cellulose, methyl hydroxyethyl cellulose, methyl carboxymethyl cellulose, and mixtures thereof. The carboxymethyl cellulose may have a degree of carboxymethyl substitution from 0.5 to 0.9 and a molecular weight from 100,000 Da to 300,000 Da.

Bleaching Agents

The detergent compositions of the present invention may comprise one or more bleaching agents. Suitable bleaching agents other than bleaching catalysts include photobleaches, bleach activators, hydrogen peroxide, sources of hydrogen peroxide, pre-formed peracids and mixtures thereof. In general, when a bleaching agent is used, the detergent compositions of the present invention may comprise from about 0.1% to about 50% or even from about 0.1% to about 25% bleaching agent by weight of the detergent composition.

Bleach Catalysts

The detergent compositions of the present invention may also include one or more bleach catalysts capable of accepting an oxygen atom from a peroxyacid and/or salt thereof, and transferring the oxygen atom to an oxidizeable substrate. Suitable bleach catalysts include, but are not limited to: iminium cations and polyions; iminium zwitterions; modified amines; modified amine oxides; N-sulphonyl imines; N-phosphonyl imines; N-acyl imines; thiadiazole dioxides; perfluoroimines; cyclic sugar ketones and mixtures thereof.

Brighteners

Optical brighteners or other brightening or whitening agents may be incorporated at levels of from about 0.01% to about 1.2%, by weight of the composition, into the cleaning compositions described herein. Commercial fluorescent brighteners suitable for the present invention can be classified into subgroups, including but not limited to: derivatives of stilbene, pyrazoline, coumarin, benzoxazoles, carboxylic acid, methinecyanines, dibenzothiophene-5,5-dioxide, azoles, 5- and 6-membered-ring heterocycles, and other miscellaneous agents.

Water-Soluble Film

The compositions of the present invention may also be encapsulated within a water-soluble film. Preferred film materials are preferably polymeric materials. The film material can, for example, be obtained by casting, blow-moulding, extrusion or blown extrusion of the polymeric material, as known in the art.

Preferred polymers, copolymers or derivatives thereof suitable for use as pouch material are selected from polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum. More preferred polymers are selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and most preferably selected from polyvinyl alcohols, polyvinyl alcohol copolymers and hydroxypropyl methyl cellulose (HPMC), and combinations thereof. Preferably, the level of polymer in the pouch material, for example a PVA polymer, is at least 60%. The polymer can have any weight average molecular weight, preferably from about 1000 to 1,000,000, more preferably from about 10,000 to 300,000 yet more preferably from about 20,000 to 150,000. Mixtures of polymers can also be used as the pouch material.

Most preferred polymers materials are PVA films known under the MonoSol trade reference M8630, M8900, H8779.

Fabric Hueing Agents

The composition may comprise a fabric hueing agent (sometimes referred to as shading, bluing or whitening agents). Typically, the hueing agent provides a blue or violet shade to fabric. Hueing agents can be used either alone or in combination to create a specific shade of hueing and/or to shade different fabric types. This may be provided for example by mixing a red and green-blue dye to yield a blue or violet shade. Hueing agents may be selected from any known chemical class of dye, including but not limited to acridine, anthraquinone (including polycyclic quinones), azine, azo (e.g., monoazo, disazo, trisazo, tetrakisazo, polyazo), including premetallized azo, benzodifurane and benzodifuranone, carotenoid, coumarin, cyanine, diazahemicyanine, diphenylmethane, formazan, hemicyanine, indigoids, methane, naphthalimides, naphthoquinone, nitro and nitroso, oxazine, phthalocyanine, pyrazoles, stilbene, styryl, triarylmethane, triphenylmethane, xanthenes and mixtures thereof.

Suitable fabric hueing agents include dyes, dye-clay conjugates, and organic and inorganic pigments. Suitable dyes include small molecule dyes and polymeric dyes. Suitable small molecule dyes include small molecule dyes selected from the group consisting of dyes falling into the Colour Index (C.I.) classifications of Direct, Basic, Reactive or hydrolyzed Reactive, Solvent or Disperse dyes for example that are classified as Blue, Violet, Red, Green or Black, and provide the desired shade either alone or in combination. Suitable polymeric dyes include polymeric dyes selected from the group consisting of polymers containing covalently bound (sometimes referred to as conjugated) chromogens, (dye-polymer conjugates), for example polymers with chromogens co-polymerized into the backbone of the polymer and mixtures thereof.

Suitable dye clay conjugates include dye clay conjugates selected from the group comprising at least one cationic/basic dye and a smectite clay, and mixtures thereof. Suitable pigments include pigments selected from the group consisting of flavanthrone, indanthrone, chlorinated indanthrone containing from 1 to 4 chlorine atoms, pyranthrone, dichloropyranthrone, monobromodichloropyranthrone, dibromodichloropyranthrone, tetrabromopyranthrone, perylene-3,4,9,10-tetracarboxylic acid diimide, wherein the imide groups may be unsubstituted or substituted by C1-C3-alkyl or a phenyl or heterocyclic radical, and wherein the phenyl and heterocyclic radicals may additionally carry substituents which do not confer solubility in water, anthrapyrimidinecarboxylic acid amides, violanthrone, isoviolanthrone, dioxazine pigments, copper phthalocyanine which may contain up to 2 chlorine atoms per molecule, polychloro-copper phthalocyanine or polybromochloro-copper phthalocyanine containing up to 14 bromine atoms per molecule and mixtures thereof.

The aforementioned fabric hueing agents can be used in combination (any mixture of fabric hueing agents can be used).

Dispersed Perfume

The composition of the present invention may comprise a dispersed perfume composition. By dispersed perfume we herein mean a perfume composition that is freely dispersed in the fabric softener composition and is not encapsulated. A perfume composition comprises one or more perfume raw materials. Perfume raw materials are the individual chemical compounds that are used to make a perfume composition. The choice of type and number of perfume raw materials is dependent upon the final desired scent. In the context of the present invention, any suitable perfume composition may be used. Those skilled in the art will recognize suitable compatible perfume raw materials for use in the perfume composition, and will know how to select combinations of ingredients to achieve desired scents.

Preferably, the level of dispersed perfume is at a level of from 0.1% to 10%, preferably 0.3% to 7.5%, more preferably from 0.5% to 5.0% by total weight of the composition.

The perfume composition may comprise from 2.5% to 30%, preferably from 5% to 30% by total weight of perfume composition of perfume raw materials characterized by a logP lower than 3.0, and a boiling point lower than 250° C. The perfume composition may comprise from 5% to 30%, preferably from 7% to 25% by total weight of perfume composition of perfume raw materials characterized by having a logP lower than 3.0 and a boiling point higher than 250° C. The perfume composition may comprise from 35% to 60%, preferably from 40% to 55% by total weight of perfume composition of perfume raw materials characterized by having a logP higher than 3.0 and a boiling point lower than 250° C. The perfume composition may comprise from 10% to 45%, preferably from 12% to 40% by total weight of perfume composition of perfume raw materials characterized by having a logP higher than 3.0 and a boiling point higher than 250° C.

Perfume Delivery Technologies

The consumer products may comprise one or more perfume delivery technologies that stabilize and enhance the deposition and release of perfume ingredients from treated substrate. Such perfume delivery technologies can also be used to increase the longevity of perfume release from the treated substrate. Perfume delivery technologies, methods of making certain perfume delivery technologies and the uses of such perfume delivery technologies are disclosed in US 2007/0275866 A1.

The fluid fabric enhancer composition may comprise from about 0.001% to about 20%, or from about 0.01% to about 10%, or from about 0.05% to about 5%, or even from about 0.1% to about 0.5% by weight of the perfume delivery technology. Said perfume delivery technologies may be selected from the group consisting of: perfume capsules, pro-perfumes, polymer particles, functionalized silicones, polymer assisted delivery, molecule assisted delivery, fiber assisted delivery, amine assisted delivery, cyclodextrins, starch encapsulated accord, zeolite and inorganic carrier, and mixtures thereof.

Said perfume delivery technology may comprise microcapsules formed by at least partially surrounding a perfume with a wall material. The capsule wall material may comprise: melamine, polyacrylamide, silicones, silica, polystyrene, polyurea, polyurethanes, polyacrylate based materials, polyacrylate esters based materials, gelatin, styrene malic anhydride, polyamides, aromatic alcohols, polyvinyl alcohol and mixtures thereof. Said melamine wall material may comprise melamine crosslinked with formaldehyde, melamine-dimethoxyethanol crosslinked with formaldehyde, and mixtures thereof. Said polyacrylate based wall materials may comprise polyacrylate formed from methylmethacrylate/dimethylaminomethyl methacrylate, polyacrylate formed from amine acrylate and/or methacrylate and strong acid, polyacrylate formed from carboxylic acid acrylate and/or methacrylate monomer and strong base, polyacrylate formed from an amine acrylate and/or methacrylate monomer and a carboxylic acid acrylate and/or carboxylic acid methacrylate monomer, and mixtures thereof.

Said polyurea based wall material may comprise a polyisocyanate. The polyisocyanate may be an aromatic polyisocyanate containing a phenyl, a toluoyl, a xylyl, a naphthyl or a diphenyl moiety (e.g., a polyisocyanurate of toluene diisocyanate, a trimethylol propane-adduct of toluene diisocyanate or a trimethylol propane-adduct of xylylene diisocyanate), an aliphatic polyisocyanate (e.g., a trimer of hexamethylene diisocyanate, a trimer of isophorone diisocyanate and a biuret of hexamethylene diisocyanate), or a mixture thereof (e.g., a mixture of a biuret of hexamethylene diisocyanate and a trimethylol propane-adduct of xylylene diisocyanate). The polyisocyante may be cross-linked, the cross-linking agent being a polyamine (e.g., diethylenetriamine, bis(3-aminopropyl)amine, bis(hexanethylene)triamine, tris(2-aminoethyl)amine, triethylenetetramine, N,N'-bis(3-aminopropyl)-1,3-propanediamine, tetraethylenepentamine, pentaethylenehexamine, branched polyethylenimine, chitosan, nisin, gelatin, 1,3-diaminoguanidine monohydrochloride, 1,1-dimethylbiguanide hydrochloride, or guanidine carbonate).

Said polyvinyl alcohol based wall material may comprise a crosslinked, hydrophobically modified polyvinyl alcohol, which comprises a crosslinking agent comprising i) a first dextran aldehyde having a molecular weight of from 2,000 to 50,000 Da; and ii) a second dextran aldehyde having a molecular weight of from greater than 50,000 to 2,000,000 Da.

The perfume capsule may be coated with a deposition aid, a cationic polymer, a non-ionic polymer, an anionic polymer, or mixtures thereof. Suitable polymers may be selected from the group consisting of: polyvinylformaldehyde, partially hydroxylated polyvinylformaldehyde, polyvinylamine, polyethyleneimine, ethoxylated polyethyleneimine, polyvinylalcohol, polyacrylates, and combinations thereof. One or more types of microcapsules, for examples two microcapsules types, wherein one of the first or second microcapsules (a) has a wall made of a different wall material than the other; (b) has a wall that includes a different amount of wall material or monomer than the other; or (c) contains a different amount perfume oil ingredient than the other; or (d) contains a different perfume oil, may be used.

Said perfume delivery technology may comprise an amine compound (ARP) or a thio compound. One may also use "reactive" polymeric amines and or polymeric thios in which the amine and/or thio functionality is pre-reacted with one or more perfume raw materials (PRMs) to form a compound. Typically, the reactive amines are primary and/or secondary amines, and may be part of a polymer or a monomer (non-polymer). Such ARPs may also be mixed with additional PRMs to provide benefits of polymer-assisted delivery and/or amine-assisted delivery. Nonlimiting examples of polymeric amines include polymers based on polyalkylimines, such as polyethyleneimine (PEI), or polyvinylamine (PVAm). Nonlimiting examples of monomeric (non-polymeric) amines include hydroxyl amines, such as 2-aminoethanol and its alkyl substituted derivatives, and aromatic amines such as anthranilates. The ARPs may be premixed with perfume or added separately in leave-on or rinse-off applications. A material that contains a heteroatom other than nitrogen and/or sulfur, for example oxygen, phosphorus or selenium, may be used as an alternative to amine compounds. A single molecule may comprise an amine moiety and one or more of the alternative heteroatom moieties, for example, thiols, phosphines and selenols. The benefit may include improved delivery of perfume as well as controlled perfume release.

Dye Transfer Inhibiting Agents

Fabric cleaning compositions may also include one or more materials effective for inhibiting the transfer of dyes from one fabric to another during the cleaning process. Generally, such dye transfer inhibiting agents may include polyvinyl pyrrolidone polymers, polyamine N-oxide polymers, copolymers of N-vinylpyrrolidone and N-vinylimidazole, manganese phthalocyanine, peroxidases, and mixtures thereof. If used, these agents may be used at a concentration of about 0.0001% to about 10%, by weight of the composition, in some examples, from about 0.01% to about 5%, by weight of the composition, preferably from about 0.05% to about 2% by weight of the composition.

Chelating Agents

The detergent compositions described herein may also contain one or more metal ion chelating agents. Suitable molecules include copper, iron and/or manganese chelating agents and mixtures thereof. Such chelating agents can be selected from the group consisting of phosphonates, amino carboxylates, amino phosphonates, succinates, polyfunctionally-substituted aromatic chelating agents, 2-pyridinol-N-oxide compounds, hydroxamic acids, carboxymethyl inulins and mixtures thereof. Chelating agents can be present in the acid or salt form including alkali metal, ammonium, and substituted ammonium salts thereof, and mixtures thereof.

Aminocarboxylates useful as chelating agents include, but are not limited to ethylenediaminetetracetates (EDTA); N-(hydroxyethyl)ethylenediaminetriacetates (HEDTA); nitrilotriacetates (NTA); ethylenediamine tetraproprionates; triethylenetetraaminehexacetates, diethylenetriamine-pentaacetates (DTPA); methylglycinediacetic acid (MGDA); Glutamic acid diacetic acid (GLDA); ethanoldiglycines; triethylenetetraaminehexaacetic acid (TTHA); N-hydroxyethyliminodiacetic acid (HEIDA); dihydroxyethylglycine (DHEG); ethylenediaminetetrapropionic acid (EDTP) and derivatives thereof.

Phosphorus containing chelants include, but are not limited to diethylene triamine penta (methylene phosphonic acid) (DTPMP CAS 15827-60-8); ethylene diamine tetra (methylene phosphonic acid) (EDTMP CAS 1429-50-1); 2-Phosphonobutane 1,2,4-tricarboxylic acid (Bayhibit® AM); hexamethylene diamine tetra(methylene phosphonic acid) (CAS 56744-47-9); hydroxy-ethane diphosphonic acid (HEDP CAS 2809-21-4); hydroxyethane dimethylene phosphonic acid; 2-phosphono-1,2,4-Butanetricarboxylic acid (CAS 37971-36-1); 2-hydroxy-2-phosphono-Acetic acid (CAS 23783-26-8); Aminotri(methylenephosphonic acid) (ATMP CAS 6419-19-8); P,P'-(1,2-ethanediyl)bis-Phosphonic acid (CAS 6145-31-9); P,P'-methylenebis-Phosphonic acid (CAS 1984-15-2); Triethylenediaminetetra(methylene phosphonic acid) (CAS 28444-52-2); P-(1-hydroxy-1-methylethyl)-Phosphonic acid (CAS 4167-10-6); bis(hexamethylene triamine penta(methylenephosphonic acid)) (CAS 34690-00-1); N2,N2,N6,N6-tetrakis(phosphonomethyl)-Lysine (CAS 194933-56-7, CAS 172780-03-9), salts thereof, and mixtures thereof. Preferably, these aminophosphonates do not contain alkyl or alkenyl groups with more than about 6 carbon atoms.

A biodegradable chelator that may also be used herein is ethylenediamine disuccinate ("EDDS"). The trisodium salt of EDDA may be used, though other forms, such as magnesium salts, may also be useful. Polymeric chelants such as Trilon P® from BASF may also be useful.

Polyfunctionally-substituted aromatic chelating agents may also be used in the cleaning compositions. Compounds of this type in acid form are dihydroxydisulfobenzenes, such as 1,2-dihydroxy-3,5-disulfobenzene, also known as Tiron. Other sulphonated catechols may also be used. In addition to the disulfonic acid, the term "tiron" may also include mono- or di-sulfonate salts of the acid, such as, for example, the disodium sulfonate salt, which shares the same core molecular structure with the disulfonic acid.

Other suitable chelating agents for use herein are the commercial DEQUEST series, and chelants from Monsanto, Akzo-Nobel, DuPont, Dow, the Trilon® series from BASF and Nalco.

The chelant may be present in the detergent compositions disclosed herein at from about 0.005% to about 15% by weight, about 0.01% to about 5% by weight, about 0.1% to about 3.0% by weight, or from about 0.2% to about 0.7% by weight, or from about 0.3% to about 0.6% by weight of the detergent compositions disclosed herein.

Hygiene and Malodour

The compositions of the present invention may also comprise one or more of zinc ricinoleate, thymol, quaternary ammonium salts such as Bardac®, polyethylenimines (such as Lupasol® from BASF) and zinc complexes thereof, silver and silver compounds, especially those designed to slowly release $Ag^+$ or nano-silver dispersions.

Fillers and Carriers

Fillers and carriers may be used in the cleaning compositions described herein. As used herein, the terms "filler" and "carrier" have the same meaning and can be used interchangeably.

Liquid cleaning compositions and other forms of cleaning compositions that include a liquid component (such as liquid-containing unit dose cleaning compositions) may contain water and other solvents as fillers or carriers. Suitable solvents also include lipophilic fluids, including siloxanes, other silicones, hydrocarbons, glycol ethers, glycerine derivatives such as glycerine ethers, perfluorinated amines, perfluorinated and hydrofluoroether solvents, low-volatility nonfluorinated organic solvents, diol solvents, and mixtures thereof.

Low molecular weight primary or secondary alcohols exemplified by methanol, ethanol, propanol, and isopropanol are suitable. Monohydric alcohols may be used in some examples for solubilizing surfactants, and polyols such as those containing from 2 to about 6 carbon atoms and from 2 to about 6 hydroxy groups (e.g., 1,3-propanediol, ethylene glycol, glycerine, and 1,2-propanediol) may also be used. Amine-containing solvents, such as monoethanolamine, diethanolamine and triethanolamine, may also be used.

The cleaning compositions may contain from about 5% to about 90%, and in some examples, from about 10% to about 50%, by weight of the composition, of such carriers. For compact or super-compact heavy-duty liquid or other forms of cleaning compositions, the use of water may be lower than about 40% by weight of the composition, or lower than about 20%, or lower than about 5%, or less than about 4% free water, or less than about 3% free water, or less than about 2% free water, or substantially free of free water (i.e., anhydrous).

For powder or bar cleaning compositions, or forms that include a solid or powder component (such as powder-containing unit dose cleaning composition), suitable fillers may include, but are not limited to, sodium sulfate, sodium chloride, clay, or other inert solid ingredients.

For either compacted or supercompacted liquid or powder cleaning compositions, or other forms, the level of liquid or solid filler in the product may be reduced, such that either the same amount of active chemistry is delivered to the wash liquor as compared to noncompacted cleaning compositions, or in some examples, the cleaning composition is more efficient such that less active chemistry is delivered to the wash liquor as compared to noncompacted compositions. The wash liquor may be formed by contacting the cleaning composition to water in such an amount so that the concentration of cleaning composition in the wash liquor is from above 0 g/l to 6 g/l. In some examples, the concentration may be from about 0.5 g/l to about 5 g/l, or to about 3.0 g/l, or to about 2.5 g/l, or to about 2.0 g/l, or to about 1.5 g/l, or from about 0 g/l to about 1.0 g/l, or from about 0 g/l to about 0.5 g/l. These dosages are not intended to be limiting, and other dosages may be used that will be apparent to those of ordinary skill in the art.

Buffer System

The cleaning compositions described herein may be formulated such that, during use in aqueous cleaning operations, the wash water will have a pH of between about 3.0 and about 11.5, and in some examples, between about 5.0 and about 10. Techniques for controlling pH at recommended usage levels include the use of buffers, alkalis, or acids, and are well known to those skilled in the art. These include, but are not limited to, the use of sodium carbonate, citric acid or sodium citrate, lactic acid or lactate, monoethanol amine or other amines, boric acid or borates, and other pH-adjusting compounds well known in the art.

In an embodiment the siloxane polymer is part of a laundry powder composition, such as that exemplified below.

Laundry Powder Detergent Composition Examples

| Ingredient | Amount (in wt %) |
|---|---|
| Anionic detersive surfactant (such as alkyl benzene sulphonate, alkyl ethoxylated sulphate and mixtures thereof) | from 8 wt % to 15 wt % |
| Non-ionic detersive surfactant (such as alkyl ethoxylated alcohol) | from 0.1 wt % to 4 wt % |
| Cationic detersive surfactant (such as quaternary ammonium compounds) | from 0 wt % to 4 wt % |
| Other detersive surfactant (such as zwiterionic detersive surfactants, amphoteric surfactants and mixtures thereof) | from 0 wt % to 4 wt % |
| Carboxylate polymer (such as co-polymers of maleic acid and acrylic acid and/or carboxylate polymers comprising ether moieties and sulfonate moieties) | from 0.1 wt % to 4 wt % |
| Polyethylene glycol polymer (such as a polyethylene glycol polymer comprising polyvinyl acetate side chains) | from 0 wt % to 4 wt % |
| Polyester soil release polymer (such as Repel-o-tex and/or Texcare polymers) | from 0 wt % to 2 wt % |
| Cellulosic polymer (such as carboxymethyl cellulose, methyl cellulose and combinations thereof) | from 0.5 wt % to 2 wt % |
| Other polymer (such as care polymers) | from 0 wt % to 4 wt % |
| Zeolite builder and phosphate builder (such as zeolite 4A and/or sodium tripolyphosphate) | from 0 wt % to 4 wt % |
| Other co-builder (such as sodium citrate and/or citric acid) | from 0 wt % to 3 wt % |
| Carbonate salt (such as sodium carbonate and/or sodium bicarbonate) | from 0 wt % to 20 wt % |
| Silicate salt (such as sodium silicate) | from 0 wt % to 10 wt % |
| Filler (such as sodium sulphate and/or bio-fillers) | from 10 wt % to 70 wt % |
| Source of hydrogen peroxide (such as sodium percarbonate) | from 0 wt % to 20 wt % |
| Bleach activator (such as tetraacetylethylene diamine (TAED) and/or nonanoyloxybenzenesulphonate (NOBS)) | from 0 wt % to 8 wt % |
| Bleach catalyst (such as oxaziridinium-based bleach catalyst and/or transition metal bleach catalyst) | from 0 wt % to 0.1 wt % |
| Other bleach (such as reducing bleach and/or pre-formed peracid) | from 0 wt % to 10 wt % |
| Photobleach (such as zinc and/or aluminium sulphonated phthalocyanine) | from 0 wt % to 0.1 wt % |
| Chelant (such as ethylenediamine-N'N'-disuccinic acid (EDDS) and/or hydroxyethane diphosphonic acid (HEDP)) | from 0.2 wt % to 1 wt % |
| Hueing agent (such as direct violet 9, 66, 99, acid red 50, solvent violet 13 and any combination thereof) | from 0 wt % to 1 wt % |
| Brightener (C.I. fluorescent brightener 260 or C.I. fluorescent brightener 351) | from 0.1 wt % to 0.4 wt % |
| Protease (such as Savinase, Savinase Ultra, Purafect, FN3, FN4 and any combination thereof) | from 0.1 wt % to 0.4 wt % |
| Amylase (such as Termamyl, Termamyl ultra, Natalase, Optisize, Stainzyme, Stainzyme Plus and any combination thereof) | from 0 wt % to 0.2 wt % |
| Cellulase (such as Carezyme and/or Celluclean) | from 0 wt % to 0.2 wt % |
| Lipase (such as Lipex, Lipolex, Lipoclean and any combination thereof) | from 0 wt % to 1 wt % |
| Other enzyme (such as xyloglucanase, cutinase, pectate lyase, mannanase, bleaching enzyme) | from 0 wt % to 2 wt % |
| Fabric softener (such as montmorillonite clay and/or polydimethylsiloxane (PDMS)) | from 0 wt % to 15 wt % |
| Flocculant (such as polyethylene oxide) | from 0 wt % to 1 wt % |
| Suds suppressor (such as silicone and/or fatty acid) | from 0 wt % to 4 wt % |
| Perfume (such as perfume microcapsule, spray-on perfume, starch encapsulated perfume accords, perfume loaded zeolite, and any combination thereof) | from 0.1 wt % to 1 wt % |
| Aesthetics (such as coloured soap rings and/or coloured speckles/noodles) | from 0 wt % to 1 wt % |
| Miscellaneous | balance to 100 wt % |

In another embodiment the siloxane polymer is part of a solid delivery agent. A preferred solid delivery agent comprises from 60% to 98% by weight of the composition of polyethylene glycol having a molecular weight from 5,000 to 11,000; from 2% to 12% by weight of the composition of free perfume; and preferably from 2% to 12% by weight thereof of perfume microcapsules comprising encapsulated perfume.

Another preferred solid delivery agent comprises a water soluble carrier that acts to carry the siloxane polymer to the wash liquor. Upon dissolution of the carrier, the siloxane polymer is released into the wash liquor.

The water soluble carrier can be a material that is soluble in a wash liquor within a short period of time, for instance less than about 10 minutes. The water soluble carrier can be selected from the group consisting of water soluble inorganic alkali metal salt, water-soluble alkaline earth metal salt, water-soluble organic alkali metal salt, water-soluble organic alkaline earth metal salt, water soluble carbohydrate, water-soluble silicate, water soluble urea, and any combination thereof.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

EXAMPLES

Examples 1 through 6 are examples of making the disclosed siloxanes having cleavable backbones. Examples 7 through 10 are examples of consumer products comprising such siloxanes having cleavable backbones. Such consumer products may be used in the manner that such type of consumer products are typically used.

Example 1

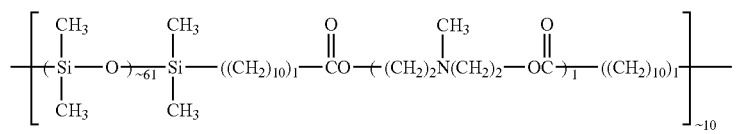

An ester functionalized polydimethylsiloxane is produced as follows:

Undecylenic acid (100.00 g; Available from Sigma-Aldrich, St. Louis, Mo.) is combined with N-methyldiethanolamine (33.95 g; Available from Alfa Aesar, Haverhill, Mass.), p-toluenesulfonic acid (0.10 g; Available from Sigma-Aldrich, St. Louis, Mo.) and toluene (200 mL). The mixture is refluxed with stirring for 4 days with water removal via Dean-Stark Trap, yielding a 50 wt % active diallyl intermediate toluene solution. The diallyl intermediate (44.17 g of 50 wt % solution) is combined with hydride terminated polydimethylsiloxane, DMS-H21 (200.00 g; Available from Gelest, Inc., Morrisville, Pa.) and the mixture heated to 80° C. with stirring. Platinum(0)-1,3-divinyl-1,1,3,3-tetramethyldisiloxane complex solution, in xylene, Pt ~2% (0.5 g; Available from Sigma-Aldrich, St. Louis, Mo.) is added dropwise and the mixture heated for 1 hour at 85° C. The toluene is removed via rotary evaporation under reduced pressure to yield a viscous liquid.

Example 2

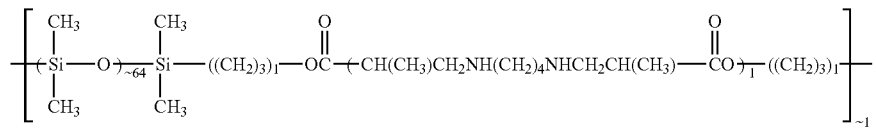

An amino/methacryloyloxy Michael Adduct functionalized polydimethylsiloxane is produced as follows:

A methacryloyloxypropyl terminated polydimethylsiloxane, DMS-R18 (30.00 g; 5,000 MW; Available from Gelest, Inc., Morrisville, Pa.) is combined with 1,4-diaminobutane (1.06 g; Available from Sigma-Aldrich, St. Louis, Mo.) and 2-ethyl-1-hexanol (0.63 g; Available from Sigma-Aldrich, St. Louis, Mo.). The mixture is heated with stirring for 88 hours at 160° C. to yield a viscous liquid.

Example 3

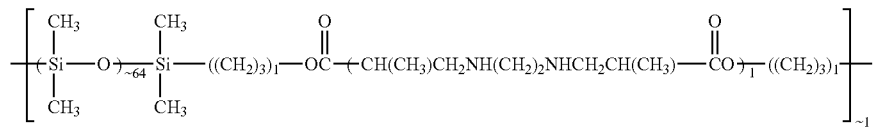

An amino/methacryloyloxy Michael Adduct functionalized polydimethylsiloxane is produced as follows:

A methacryloyloxypropyl terminated polydimethylsiloxane, DMS-R31 (10.00 g; 25,000 MW; Available from Gelest, Inc., Morrisville, Pa.) is combined with ethylenediamine (0.19 g; Available from Sigma-Aldrich, St. Louis, Mo.) and 2-ethyl-1-hexanol (2.55 g; Available from Sigma-Aldrich, St. Louis, Mo.). The mixture is heated with stirring for 18 hours at 135° C. Excess ethylenediamine is removed via rotary evaporation under reduced pressure to yield a viscous liquid.

Example 4

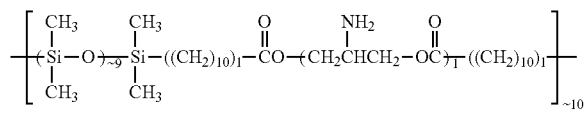

An ester functionalized polydimethylsiloxane is produced as follows:

A carboxydecyl terminated polydimethylsiloxane, DMS-B12 (25.00 g; 1,000 MW; Available from Gelest, Inc., Morrisville, Pa.) is combined with 2-amino-1,3-propanediol (2.51 g; Available from Sigma-Aldrich, St. Louis, Mo.) and cumene sulfonic acid (5.51 g; Available from Nease, West Chester, Ohio). The mixture is heated with stirring and nitrogen sweep for 16 hours at 150° C.

Example 5

An ester functionalized polydimethylsiloxane is produced as follows:

A carbinol (hydroxy) terminated polydimethylsiloxane, DMS-C21 (25.00 g; 4000 MW; Available from Gelest, Inc., Morrisville, Pa.) is combined with succinic anhydride (0.69 g; Available from Sigma-Aldrich, St. Louis, Mo.) and cumene sulfonic acid (0.06 g; Available from Nease, West Chester, Ohio). The mixture is heated with stirring and nitrogen sweep for 16 hours at 150° C.

Siloxane Emulsification Procedure:

| Component | Wt. % in Emulsion |
| --- | --- |
| Siloxane of any Example 1-4 | 20.0 |
| TERGITOL ™ 15-S-5 Surfactant; The Dow Chemical Company | 1.4 |
| TERGITOL ™ 15-S-12 Surfactant; The Dow Chemical Company | 2.1 |
| Water | 76.5 |
| Acetic Acid | As required |

To the siloxane is added TERGITOL™ 15-S-5 Surfactant and TERGITOL™ 15-S-12 Surfactant. The mixture is stirred for 10 minutes with an IKA Model RW20D-S1 Mixer and IKA R1342 impeller blade at 500 rpm. Water is then added gradually and evenly over a period of 15 minutes. The pH is adjusted to a pH of 4.5-5.5 with acetic acid. The mixture is stirred an additional 15 minutes.

Application of Siloxane Emulsion to Fabric:

Desized Polyester/Cotton 50/50 Jersey Knit 10 in×10 in fabric swatches, 7422, (Available from Testfabrics, Inc., West Pittston, Pa., USA) are padded with the siloxane emulsions by utilization of a Mathis Padder, Model HVF 58601 operated at 2 meter/min, 2 bar roller pressure and

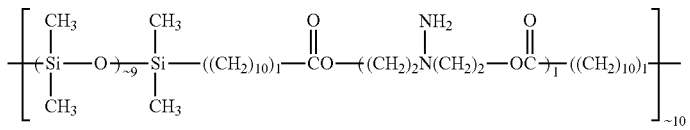

An ester functionalized polydimethylsiloxane is produced as follows:

A carboxydecyl terminated polydimethylsiloxane, DMS-B12 (25.00 g; 1,000 MW; Available from Gelest, Inc., Morrisville, Pa.) is combined with (3-Aminopropyl)bis(2-hydroxyethyl)amine (4.46 g; Available from Sigma-Aldrich, St. Louis, Mo.) and cumene sulfonic acid (5.51 g; Available from Nease, West Chester, Ohio). The mixture is heated with stirring and nitrogen sweep for 16 hours at 150° C.

Example 6

91% pick-up, achieving a loading of 3 mg/g of siloxane. Fabric swatches are dried via heated tumble dryer.

Softness Performance Index Versus Water:

Softness Performance Index versus Water is determined by measurement of the absolute secant modulus of the treated fabrics using an Instron Model 5944 Materials Testing System.

Static Load Cell—100 N (10 kg, 22 lb.)—Type OOf, Of
Pneumatic Side Action Grips—Capacity 250 N (50 lbf, 25 kgf)

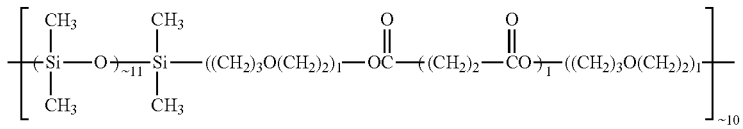

Grip Jaw Faces—Faces, Serrated, 25 mm wide×25 mm high (1×1 in)
70±3.6° F. (21±2° C.) and 50±2% relative humidity
Fabric dimension—1" wide and at least 4" long in warp direction
Instrument Settings

| Variable | Setting |
|---|---|
| Air Pressure | 60 psi |
| Load Cell | 100N |
| Maximum Strain | 35% |
| Rate of Strain | 150 mm/min |
| Pre-load Force | 0.05N (±0.015N) |

Absolute Secant Modulus (MPa) is the average of the moduli obtained from 10 fabric strips, for a given treatment, measured on the $4^{th}$ cycle of 4 hysteresis cycles, at maximum strain, on the same fabric strip.

Softness Performance Index versus Water is calculated as follows: Absolute Secant Modulus of water treated fabric divided by the Absolute Secant Modulus of a siloxane polymer treated fabric×100

A >100 Softness Performance Index correlates with higher fabric softness versus water alone.

TABLE 1

Performance Data:

| | Softness Performance Index |
|---|---|
| Example 1 | 205 |
| Example 2 | 247 |

Hydrolysis Rate of Functionalized Silicone
Procedure Overview

The test was conducted at 21° C. in a phosphate buffered solution using esterase and lipase enzymes (Sigma Aldrich). These enzymes were recombinant from a variety of organisms that are ubiquitous in the environment. The material tested was the siloxane polymer of Example 1. The polymer was added to the aqueous system in tetrahydrofuran (THF) to a target concentration of 2.5 µg/mL polymer and 1% solvent by volume. The enzymes were added in excess. The analytical endpoint was the appearance of the amine moiety, methyl diethanolamine (MDEA), which would release upon hydrolysis of the adjacent ester groups. MDEA was measured by HPLC/MS/MS, using hydrophilic interaction liquid chromatography and $^2H_3$-MDEA as an internal standard. The lower limit of quantitation (LOQ) was 0.10 ng/mL or 3.2% of theoretical MDEA dosed to the test system as polymer. Controls were run to monitor enzymatic activity in the presence of polymer and solvent, measure background MDEA levels in the absence of polymer, and check for non-enzymatic hydrolysis of the ester bonds. The test was conducted in triplicate and sampled at 0, 4 and 24 hr. Results are expressed as a percentage of theoretical MDEA.

| Time (hr) | % of Theoretical MDEA Release (Mean ± Std Deviation) |
|---|---|
| 0 | <3.2 |
| 4 | 41.3 ± 19.4 |
| 24 | 86.7 ± 11.1 |

As shown in Table 2, the ester bonds within the siloxane polymer are cleaved in the presence of esterase enzyme commonly found in the environment. % of total ester bonds hydrolyzed in water is directly equivalent to the % release of theoretical MDEA.

Examples 7: Liquid Fabric Enhancer

Liquid Fabric Enhancers are prepared by mixing together ingredients shown elow:

| EXAMPLE COMPOSITION | 7A | 7B | 7C |
|---|---|---|---|
| Fabric Softener Active[1] | 8.0 | 7.5 | 7.5 |
| Quaternized polyacrylamide[2] | 0.135 | 0.135 | 0.135 |
| Siloxane Polymer From Example 1 | 4.0 | — | — |
| Siloxane Polymer From Example 2 | — | 4.0 | — |
| Siloxane Polymer From Example 3 | — | — | 4.0 |
| Water soluble dialkyl quat[4] | 0.2 | 0.2 | 0.2 |
| Water, emulsifiers, perfume, suds suppressor, stabilizers, preservative, antioxidant, chelant, pH control agents, buffers, dyes & other optional ingredients | q.s. to 100% pH = 3.0 | qs. to 100% pH = 3.0 | qs. to 100% pH = 3.0 |

Example 8—Non-Limiting Examples of Product Formulations Containing a Silicone Compound are Summarized in the Following Table

| | EXAMPLES Wt % in the Formula | | | | | | | | | |
|---|---|---|---|---|---|---|---|---|---|---|
| | 8A | 8B | 8C | 8D | 8E | 8F | 8G | 8H | 8I | 8J |
| FSA[a] | 14 | 16.47 | 14 | 12 | 12 | 16.47 | — | — | 5 | 5 |
| FSA[b] | | | | | — | | 3.00 | — | — | — |
| FSA[c] | | | | | — | | — | 6.5 | — | — |
| Ethanol | 2.18 | 2.57 | 2.18 | 1.95 | 1.95 | 2.57 | — | — | 0.81 | 0.81 |
| Isopropyl Alcohol | — | — | — | — | — | — | 0.33 | 1.22 | — | — |
| Starch[d] | 1.25 | 1.47 | 2.00 | 1.25 | — | 2.30 | 0.5 | 0.70 | 0.71 | 0.42 |
| Silicone compound according to Examples 1-6 | 0.6 | 0.75 | 0.6 | 0.75 | 0.37 | 0.60 | 0.37 | 0.6 | 0.37 | 0.37 |
| Phase Stabilizing Polymer[f] | 0.21 | 0.25 | 0.21 | 0.21 | 0.14 | — | — | 0.14 | — | — |

-continued

| | EXAMPLES Wt % in the Formula | | | | | | | | | |
|---|---|---|---|---|---|---|---|---|---|---|
| | 8A | 8B | 8C | 8D | 8E | 8F | 8G | 8H | 8I | 8J |
| Calcium Chloride | 0.15 | 0.176 | 0.15 | 0.15 | 0.30 | 0.176 | — | 0.1-0.15 | — | — |
| DTPA[h] | 0.017 | 0.017 | 0.017 | 0.017 | 0.007 | 0.007 | 0.20 | — | 0.002 | 0.002 |
| Preservative (ppm)[i,j] | 5 | 5 | 5 | 5 | 5 | 5 | — | 250[j] | 5 | 5 |
| Antifoam[k] | 0.015 | 0.018 | 0.015 | 0.015 | 0.015 | 0.015 | — | 0.1 | 0.015 | 0.015 |
| Dye (ppm) | 40 | 40 | 40 | 40 | 40 | 40 | 11 | 30-300 | 30 | 30 |
| Ammonium Chloride | 0.100 | 0.118 | 0.100 | 0.100 | 0.115 | 0.115 | — | — | — | — |
| HCl | 0.012 | 0.014 | 0.012 | 0.012 | 0.028 | 0.028 | 0.016 | 0.025 | 0.011 | 0.011 |
| Structurant[l] | 0.01 | 0.01 | 0.01 | 0.01 | 0.01 | 0.01 | 0.01 | 0.01 | 0.01 | 0.01 |
| Perfume | 0.8 | 0.7 | 0.9 | 0.5 | 1.2 | 0.5 | 1.1 | 0.6 | 1.0 | 0.9 |
| Deionized Water | * | * | * | * | * | * | * | * | * | * |

* Balance
[a]N,N-di(tallowoyloxyethyl)-N,N-dimethylammonium chloride.
[b]Methyl bis(tallow amidoethyl)2-hydroxyethyl ammonium methyl sulfate.
[c]Compound of Fatty acid with Methyldiethanolamine in a molar ratio 1.5:1, quaternized with Methylchloride, resulting in a 1:1 molar mixture of N,N-bis(stearoyl-oxy-ethyl) N,N-dimethyl ammonium chloride and N-(stearoyl-oxy-ethyl) N,-hydroxyethyl N,N dimethyl ammonium chloride.
[d]Cationic high amylose maize starch available from National Starch under the trade name CATO ®.
[f]Copolymer of ethylene oxide and terephthalate having the formula described in U.S. Pat. No. 5,574,179 at col.15, lines 1-5, wherein each X is methyl, each n is 40, u is 4, each R1 is essentially 1,4-phenylene moieties, each R2 is essentially ethylene, 1,2-propylene moieties, or mixtures thereof.
[g]SE39 from Wacker
[h]Diethylenetriaminepentaacetic acid.
[i]KATHON ® CG available from Rohm and Haas Co. "PPM" is "parts per million."
[j]Gluteraldehyde
[k]Silicone antifoam agent available from Dow Corning Corp. under the trade name DC2310.
[l]Hydrophobically-modified ethoxylated urethane available from Rohm and Haas under the tradename Aculan 44.

Example 9—Non-Limiting Examples of Dry Laundry Formulations Containing a Silicone Compound are Summarized in the Following Table

| | Wt % in the Formula | | | | | | |
|---|---|---|---|---|---|---|---|
| Component | 9A | 9B | 9C | 9D | 9E | 9F | 9G |
| Brightener | 0.1 | 0.1 | 0.1 | 0.2 | 0.1 | 0.2 | 0.1 |
| Soap | 0.6 | 0.6 | 0.6 | 0.6 | 0.6 | 0.6 | 0.6 |
| Ethylenediamine disuccinic acid | 0.1 | 0.1 | 0.1 | 0.1 | 0.1 | 0.1 | 0.1 |
| Acrylate/maleate copolymer | 1.5 | 1.5 | 1.5 | 1.5 | 1.5 | 1.5 | 1.5 |
| Hydroxyethane di(methylene phosphonic acid) | 0.4 | 0.4 | 0.4 | 0.4 | 0.4 | 0.4 | 0.4 |
| Mono-$C_{12-14}$ alkyl, di-methyl, mono-hydroxyethyl quaternary ammonium chloride | 0.5 | 0.5 | 0.5 | 0.5 | 0.5 | 0.5 | 0.5 |
| Linear alkyl benzene | 0.1 | 0.1 | 0.2 | 0.1 | 0.1 | 0.2 | 0.1 |
| Linear alkyl benzene sulphonate | 10.3 | 10.1 | 19.9 | 14.7 | 10.3 | 17 | 10.5 |
| Magnesium sulphate | 0.4 | 0.4 | 0.4 | 0.4 | 0.4 | 0.4 | 0.4 |
| Sodium carbonate | 19.5 | 19.2 | 10.1 | 18.5 | 29.9 | 10.1 | 16.8 |
| Sodium sulphate | 29.6 | 29.8 | 38.8 | 15.1 | 24.4 | 19.7 | 19.1 |
| Sodium Chloride | 0.1 | 0.1 | 0.1 | 0.1 | 0.1 | 0.1 | 0.1 |
| Zeolite | 9.6 | 9.4 | 8.1 | 18 | 10 | 13.2 | 17.3 |
| Photobleach particle | 0.1 | 0.1 | 0.2 | 0.1 | 0.2 | 0.1 | 0.2 |
| Blue and red carbonate speckles | 1.8 | 1.8 | 1.8 | 1.8 | 1.8 | 1.8 | 1.8 |
| Ethoxylated Alcohol AE7 | 1 | 1 | 1 | 1 | 1 | 1 | 1 |
| Tetraacetyl ethylene diamine agglomerate (92 wt % active) | 0.9 | 0.9 | 0.9 | 0.9 | 0.9 | 0.9 | 0.9 |
| Citric acid | 1.4 | 1.4 | 1.4 | 1.4 | 1.4 | 1.4 | 1.4 |
| PDMS/clay agglomerates (9.5% wt % active PDMS) | 10.5 | 10.3 | 5 | 15 | 5.1 | 7.3 | 10.2 |
| Polyethylene oxide | 0.2 | 0.2 | 0.2 | 0.2 | 0.2 | 0.2 | 0.2 |
| Enzymes e.g. Protease (84 mg/g active), Amylase (22 mg/g active) | 0.2 | 0.3 | 0.2 | 0.1 | 0.2 | 0.1 | 0.2 |
| Suds suppressor agglomerate (12.4 wt % active) | 0.2 | 0.2 | 0.2 | 0.2 | 0.2 | 0.2 | 0.2 |
| Sodium percarbonate (having from 12% to 15% active AvOx) | 7.2 | 7.1 | 4.9 | 5.4 | 6.9 | 19.3 | 13.1 |

-continued

|                                                  | Wt % in the Formula |     |     |     |     |     |     |
|--------------------------------------------------|-----|-----|-----|-----|-----|-----|-----|
| Component                                        | 9A  | 9B  | 9C  | 9D  | 9E  | 9F  | 9G  |
| Perfume oil                                      | 0.5 | 0.5 | 0.5 | 0.5 | 0.5 | 0.5 | 0.5 |
| Solid perfume particles                          | 0.4 | 0   | 0.4 | 0.4 | 0.4 | 0.4 | 0.6 |
| Silicone compound according to Examples 1-6      | 1.3 | 2.4 | 1   | 1.3 | 1.3 | 1.3 | 0.7 |
| Balance Water*                                   | *   | *   | *   | *   | *   | *   | *   |

Example 10: Non-Limiting Examples of Solid Wash Bead or Pastille or Powder Formulations Containing a Silicone Compound are Summarized in the Following Table

|                                                    | Wt % in the Formula |           |          |           |
|----------------------------------------------------|---------------------|-----------|----------|-----------|
|                                                    | 10A                 | 10B       | 10C      | 10D       |
| Polyethylene glycol[1]                             | 70-99               | 0-20      | 0-29     | 0-40      |
| Bentonite Clay                                     | 0-29                | 0-20      | 0-20     | 0-10      |
| NaCl                                               | 0-29                | 50-99     | 0-29     | 0-40      |
| Na2SO4                                             | 0-10                | 0-10      | 0-10     | 0-5       |
| Zeolite                                            | 0-29                | 0-29      | 0-29     | 0-5       |
| Plasticizers/Solvents/water                        | *                   | *         | *        |           |
| Starch/Zeolite                                     | 0-29                | 0-29      | 0-29     | 0-5       |
| Silica                                             | 0-5                 | 0-5       | 0-5      | 0-5       |
| Perfume                                            | 0-5                 | 0-5       | 0-5      | 0-5       |
| Total Silicone compound according to Examples 1-6  | 0.001-10            | 0.001-4.5 | 0.001-3  | 0.001-7.5 |
| Balance Water*                                     | *                   | *         | *        | *         |
| Form                                               | Semi-spherical bead | Free flowing powder | Semi-spherical bead | Free flowing powder |

The dimensions and values disclosed herein are not to be understood as being strictly limited to the exact numerical values recited. Instead, unless otherwise specified, each such dimension is intended to mean both the recited value and functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A composition, wherein the composition is a laundry treatment composition in the form of a solid delivery agent, said composition comprising:

from 60% to 98% by weight of the composition of polyethylene glycol having a molecular weight from 5,000 to 11,000;

from 2% to 12% by weight of the composition of free perfume; and a siloxane polymer comprising one or more repeat units having the structure of Formula (I):

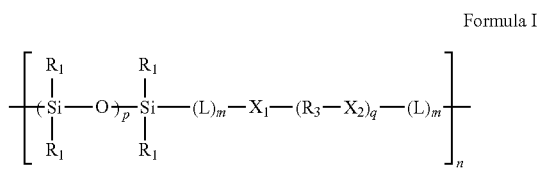

Formula I wherein:
a) each L is a linking bivalent alkylene radical independently selected from the group consisting of

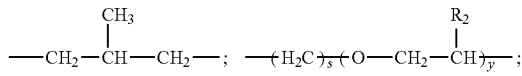

—(CH$_2$)$_s$—; and combinations thereof,
wherein
each R$_2$ is independently selected from the group consisting of H, C$_1$-C$_4$ alkyl, substituted alkyl, aryl, substituted aryl, and combinations thereof;
each s is independently an integer of from 1 to about 20;
each y is independently an integer of from 1 to about 100;
b) each X$_1$ and X$_2$ is independently selected from the group consisting of

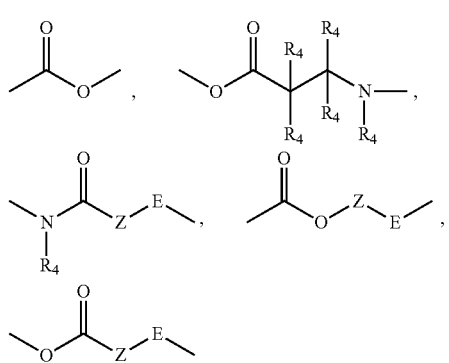

E=electron withdrawing;
each of R$_4$ moiety is independently selected from the group consisting of H, C$_1$-C$_{32}$ alkyl, C$_1$-C$_{32}$ substituted alkyl, $C_6$-$C_{32}$ aryl, $C_5$-$C_{32}$ substituted aryl, $C_6$-$C_{32}$ alkylaryl, $C_6$-$C_{32}$ substituted alkylaryl; and each Z is independently selected from the group consisting of $C_1$-$C_{32}$ alkylene, $C_1$-$C_{32}$ substituted alkylene, $C_6$-$C_{32}$ aryl, $C_5$-$C_{32}$ substituted aryl, $C_6$-$C_{32}$ alkylenearyl, and $C_5$-$C_{32}$ substituted alkylenearyl, and/or each Z is independently selected from the group consisting of:

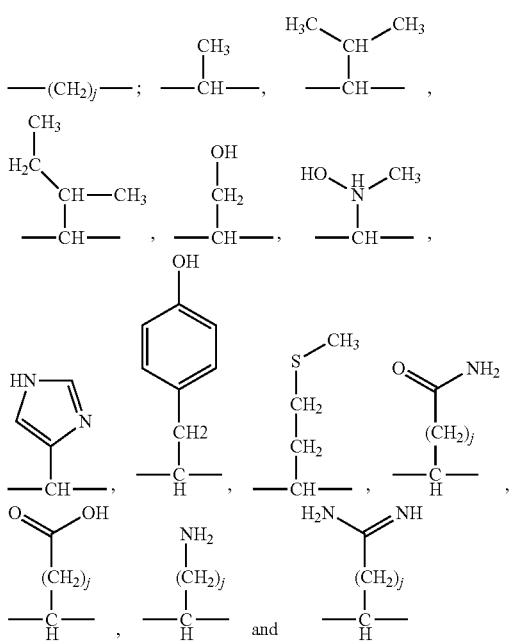

the index j is an integer from 1-32;

c) each $R_1$ is independently selected from the group consisting of H, OH, $C_1$-$C_{32}$ alkyl, $C_1$-$C_{32}$ substituted alkyl, $C_6$-$C_{32}$ aryl, $C_5$-$C_{32}$ substituted aryl, $C_6$-$C_{32}$ alkylaryl, $C_6$-$C_{32}$ substituted alkylaryl, $C_1$-$C_{32}$ alkoxy and $C_1$-$C_{32}$ substituted alkoxy;

d) each $R_3$ is independently selected from the group consisting of $C_1$-$C_{32}$ alkylene, $C_1$-$C_{32}$ substituted alkylene, $C_6$-$C_{32}$ aryl, $C_5$-$C_{32}$ substituted aryl, $C_6$-$C_{32}$ alkylenearyl, and $C_5$-$C_{32}$ substituted alkylenearyl, when $R_3$ moiety comprises two or more carbon atoms said $R_3$ moiety may optionally be interrupted by a hetero atom selected from the group consisting of N, O and S and combinations thereof;

e) each index m is one or zero;

f) each q is 1 or zero;

g) each index p is an integer of from about 2 to about 1000; and h) the index n is an integer of from about 1 to about 50; and a surfactant, said surfactant is selected from the group consisting of an anionic surfactant, a nonionic surfactant, a cationic surfactant, an amphoteric surfactant and mixtures thereof.

2. A composition according to claim 1 wherein each $X_1$ and $X_2$ is independently selected from the group consisting of

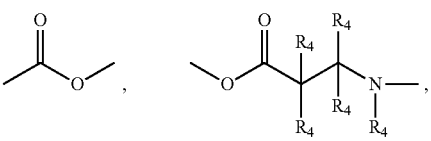

each Z is independently selected from the group consisting of $C_1$-$C_{32}$ alkylene, $C_1$-$C_{32}$ substituted alkylene, $C_6$-$C_{32}$ aryl, $C_5$-$C_{32}$ substituted aryl, $C_6$-$C_{32}$ alkylenearyl, and $C_5$-$C_{32}$ substituted alkylenearyl and m is 1.

3. A composition according to claim 1 wherein each $X_1$ and $X_2$ is independently selected from the group consisting of

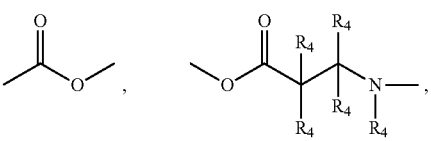

4. A composition according to claim 1 wherein each $X_1$ and $X_2$ is independently selected from the group consisting of and wherein $R_4$ is independently a hydrogen or a methyl group.

5. A composition according to claim 1, said composition comprising, based on total composition weight, from about 0.2% to about 10% of said siloxane polymer.

6. A composition according to claim 1 wherein the composition is a fabric cleaning composition or a fabric care composition.

7. A composition according to claim 1, said composition further comprising an adjunct ingredient selected from the group consisting of surfactants, color care polymers, deposition aids, surfactant boosting polymers, pH adjusters, product color stabilizers, preservatives, solvents, builders, chelating agents, dye transfer inhibiting agents, dispersants, enzymes, and enzyme stabilizers, catalytic materials, bleach, bleach activators, polymeric dispersing agents, clay soil removal/anti-redeposition agents, brighteners, suds suppressors, dyes, UV absorbers, perfume, an additional perfume delivery system, structure elasticizing agents, thickeners/structurants, fabric softeners, carriers, hydrotropes, oligoamines, processing aids, hueing agents, pigments and mixtures thereof.

8. A composition according to claim 1, said composition further comprising a deposition aid.

9. A composition according to claim 1, said composition having a pH of from about 2 to about 4.

10. A composition according to claim 1, said composition further comprising, based on total composition weight, from about 3% to about 25% of an ester quaternary ammonium compound.

11. A composition according to claim 1, said composition comprising from 8% to 15% by weight of the composition of anionic surfactant selected from the group consisting of alkyl benzene sulphonate, alkyl ethoxylated sulphate and mixtures thereof and from 0.1% to 4% by weight of the composition of an alkyl ethoxylated alcohol.

12. A composition according to claim 1, said composition further comprising from 2% to 12% by weight of the composition of perfume microcapsules comprising encapsulated perfume.

13. A composition according to claim 1, said composition further comprising a water-soluble carrier selected from the group consisting of water soluble inorganic alkali metal salt, water-soluble alkaline earth metal salt, water-soluble organic alkali metal salt, water-soluble organic alkaline earth metal salt, water soluble carbohydrate, water-soluble silicate, water soluble urea, and any combination thereof.

14. A method of treating and/or cleaning a situs, said method comprising
   a.) optionally washing and/or rinsing said situs;
   b.) contacting said situs with a composition according to claim 1; and
   c.) optionally washing and/or rinsing said situs.

\* \* \* \* \*